(12) United States Patent
Dozier et al.

(10) Patent No.: US 10,636,315 B1
(45) Date of Patent: Apr. 28, 2020

(54) METHOD AND SYSTEM FOR DEVELOPING PROCESS, PROJECT OR PROBLEM-BASED LEARNING SYSTEMS WITHIN A SEMANTIC COLLABORATIVE SOCIAL NETWORK

(75) Inventors: Linda T. Dozier, Great Falls, VA (US); Edmund J. Fish, Great Falls, VA (US); Miles R. Gilburne, Washington, DC (US); Nina Zolt, Washington, DC (US)

(73) Assignee: Cricket Media, Inc., McLean, VA (US)

( * ) Notice: Subject to any disclaimer, the term of this patent is extended or adjusted under 35 U.S.C. 154(b) by 494 days.

(21) Appl. No.: 11/937,499

(22) Filed: Nov. 8, 2007

Related U.S. Application Data

(60) Provisional application No. 60/857,560, filed on Nov. 8, 2006, provisional application No. 60/857,583, filed on Nov. 8, 2006, provisional application No. 60/857,570, filed on Nov. 8, 2006.

(51) Int. Cl.
*G09B 3/00* (2006.01)

(52) U.S. Cl.
CPC ..................... *G09B 3/00* (2013.01)

(58) Field of Classification Search
USPC ................................. 434/317, 350
See application file for complete search history.

(56) References Cited

U.S. PATENT DOCUMENTS

| | | |
|---|---|---|
| 4,740,912 A | 4/1988 | Whitaker |
| 5,710,884 A | 1/1998 | Dedrick |
| 5,740,549 A | 4/1998 | Reilly et al. |
| 5,761,662 A | 6/1998 | Dasan |
| 5,768,528 A | 6/1998 | Stumm |

(Continued)

FOREIGN PATENT DOCUMENTS

| | | |
|---|---|---|
| EP | 1338966 A2 | 8/2003 |
| FR | 2814844 A1 | 10/2000 |

(Continued)

OTHER PUBLICATIONS

U.S. Appl. No. 11/937,495, entitled "Dynamic characterization of Nodes in a Semantic Network for Desired Functions Such as Search, Discovery, Matching, Content Delivery, and Synchronization of Activity and Information," filed Nov. 8, 2007.

(Continued)

*Primary Examiner* — Kesha Frisby
(74) *Attorney, Agent, or Firm* — Nelson Mullins Riley & Scarborough LLP

(57) ABSTRACT

The system provides a framework for developing process, project or problem-based learning systems that make use of social networking. The system provides a general purpose framework to create, manage, and deliver online instruction that supports learning methods consistent with social constructivist and experiential learning theories. The framework utilizes personal social software for collaboration, problem-solving, group work, and other activities consistent with those methods. The general framework, based on finite-state automata and other methods for determining similarity of learning objectives, provides individual creators the means to define, implement, and manage experiential instruction within a social network.

22 Claims, 23 Drawing Sheets

(56) References Cited

U.S. PATENT DOCUMENTS

| | | |
|---|---|---|
| 5,772,446 A | 6/1998 | Rosen |
| 5,813,863 A * | 9/1998 | Sloane et al. ............... 434/236 |
| 5,907,831 A | 5/1999 | Lotvin et al. |
| 5,933,498 A | 8/1999 | Schneck et al. |
| 5,970,231 A | 10/1999 | Crandall |
| 5,972,875 A | 10/1999 | Crutcher et al. |
| 5,974,446 A | 10/1999 | Sonnenreich et al. |
| 5,987,606 A | 11/1999 | Cirasole et al. |
| 6,020,884 A | 2/2000 | MacNaughton et al. |
| 6,029,195 A | 2/2000 | Herz |
| 6,075,968 A * | 6/2000 | Morris et al. ............... 434/350 |
| 6,085,229 A | 7/2000 | Newman et al. |
| 6,105,027 A | 8/2000 | Schneider et al. |
| 6,157,924 A | 12/2000 | Austin |
| 6,178,407 B1 | 1/2001 | Lotvin et al. |
| 6,208,995 B1 | 3/2001 | Himmel et al. |
| 6,233,618 B1 | 5/2001 | Shannon |
| 6,249,282 B1 | 6/2001 | Sutcliffe et al. |
| 6,279,013 B1 | 8/2001 | LaMarca et al. |
| 6,296,487 B1 * | 10/2001 | Lotecka ....................... 434/118 |
| 6,302,698 B1 * | 10/2001 | Ziv-El ......................... 434/323 |
| 6,324,538 B1 | 11/2001 | Wesinger, Jr. et al. |
| 6,341,960 B1 | 1/2002 | Frasson et al. |
| 6,363,062 B1 | 3/2002 | Aaronson et al. |
| 6,370,355 B1 | 4/2002 | Ceretta et al. |
| 6,374,237 B1 | 4/2002 | Reese |
| 6,381,444 B1 | 4/2002 | Aggarwal et al. |
| 6,401,075 B1 | 6/2002 | Mason et al. |
| 6,438,632 B1 | 8/2002 | Kikugawa |
| 6,460,036 B1 | 10/2002 | Herz |
| 6,470,353 B1 | 10/2002 | Yaung et al. |
| 6,480,885 B1 | 11/2002 | Olivier |
| 6,554,618 B1 | 4/2003 | Lockwood |
| 6,560,578 B2 | 5/2003 | Eldering |
| 6,658,415 B1 | 12/2003 | Brown et al. |
| 6,684,212 B1 | 1/2004 | Day et al. |
| 6,691,106 B1 | 2/2004 | Sathyanarayan |
| 6,691,153 B1 | 2/2004 | Hanson et al. |
| 6,704,320 B1 | 3/2004 | Narvaez et al. |
| 6,718,369 B1 | 4/2004 | Dutta |
| 6,725,203 B1 | 4/2004 | Seet et al. |
| 6,741,980 B1 | 5/2004 | Langseth et al. |
| 6,757,691 B1 | 6/2004 | Welsh et al. |
| 6,766,362 B1 | 6/2004 | Miyasaka et al. |
| 6,807,558 B1 | 10/2004 | Hassell et al. |
| 6,825,945 B1 | 11/2004 | Silverbrook et al. |
| 6,826,534 B1 | 11/2004 | Gupta et al. |
| 6,842,773 B1 | 1/2005 | Ralston et al. |
| 6,845,273 B1 | 1/2005 | Taylor |
| 6,892,226 B1 | 5/2005 | Tso et al. |
| 6,920,617 B2 | 7/2005 | Nitta |
| 6,954,783 B1 | 10/2005 | Bodwell et al. |
| 6,973,462 B2 | 12/2005 | Dattero et al. |
| 6,988,839 B1 | 1/2006 | Yu |
| 7,031,651 B2 | 4/2006 | McCormick et al. |
| 7,032,022 B1 | 4/2006 | Shanumgam et al. |
| 7,035,926 B1 | 4/2006 | Cohen et al. |
| 7,120,590 B1 | 10/2006 | Eisen et al. |
| 7,127,741 B2 | 10/2006 | Bandini et al. |
| 7,162,522 B2 | 1/2007 | Adar et al. |
| 7,328,216 B2 | 2/2008 | Hofmann et al. |
| 7,464,147 B1 | 12/2008 | Fakhouri et al. |
| 7,577,665 B2 | 8/2009 | Ramer et al. |
| 7,640,336 B1 | 12/2009 | Lu et al. |
| 7,765,481 B2 | 7/2010 | Dixon et al. |
| 7,881,315 B2 | 2/2011 | Haveson et al. |
| 9,620,028 B2 | 4/2017 | Dozier et al. |
| 9,928,753 B2 | 3/2018 | Dozier et al. |
| 2001/0037407 A1 | 11/2001 | Dragulev et al. |
| 2002/0013836 A1 | 1/2002 | Friedman et al. |
| 2002/0038246 A1 | 3/2002 | Nagaishi |
| 2002/0040374 A1 | 4/2002 | Kent |
| 2002/0049806 A1 | 4/2002 | Gatz et al. |
| 2002/0064767 A1 | 5/2002 | McCormick et al. |
| 2002/0100808 A1 | 8/2002 | Norwood et al. |
| 2002/0119434 A1 | 8/2002 | Beams et al. |
| 2002/0123334 A1 | 9/2002 | Borger et al. |
| 2002/0140732 A1 | 10/2002 | Tveskov |
| 2002/0143754 A1 | 10/2002 | Paulley et al. |
| 2002/0161770 A1 | 10/2002 | Shapiro et al. |
| 2002/0169782 A1 | 11/2002 | Lehmann et al. |
| 2002/0169954 A1 | 11/2002 | Bandini et al. |
| 2002/0174230 A1 | 11/2002 | Gudorf et al. |
| 2002/0184092 A1 | 12/2002 | Cherry et al. |
| 2003/0029911 A1 | 2/2003 | Kitayama |
| 2003/0050986 A1 | 3/2003 | Matthews et al. |
| 2003/0093518 A1 | 5/2003 | Hiraga |
| 2003/0110215 A1 | 6/2003 | Joao |
| 2003/0164849 A1 | 9/2003 | Barrie et al. |
| 2003/0207245 A1 | 11/2003 | Parker |
| 2003/0227479 A1 | 12/2003 | Mizrahi et al. |
| 2004/0001087 A1 | 1/2004 | Warmus et al. |
| 2004/0014017 A1 | 1/2004 | Lo |
| 2004/0030781 A1 | 2/2004 | Etesse et al. |
| 2004/0039814 A1 | 2/2004 | Crabtree et al. |
| 2004/0049554 A1 | 3/2004 | Watanabe |
| 2004/0064515 A1 | 4/2004 | Hockey |
| 2004/0103118 A1 | 5/2004 | Irving et al. |
| 2004/0103122 A1 | 5/2004 | Irving et al. |
| 2004/0103137 A1 | 5/2004 | Irving et al. |
| 2004/0111423 A1 | 6/2004 | Irving et al. |
| 2004/0122692 A1 | 6/2004 | Irving et al. |
| 2004/0128624 A1 * | 7/2004 | Arellano et al. ............... 715/530 |
| 2004/0145770 A1 | 7/2004 | Nakano et al. |
| 2004/0165536 A1 | 8/2004 | Xu et al. |
| 2004/0167794 A1 | 8/2004 | Shostack et al. |
| 2004/0186738 A1 | 9/2004 | Reisman |
| 2004/0205578 A1 | 10/2004 | Wolff et al. |
| 2005/0014121 A1 | 1/2005 | Eck et al. |
| 2005/0014122 A1 | 1/2005 | Ruvinsky et al. |
| 2005/0015258 A1 | 1/2005 | Somani et al. |
| 2005/0033657 A1 | 2/2005 | Herrington et al. |
| 2005/0071328 A1 | 3/2005 | Lawrence |
| 2005/0079477 A1 | 4/2005 | Diesel et al. |
| 2005/0105134 A1 | 5/2005 | Moneypenny et al. |
| 2005/0165743 A1 | 7/2005 | Bharat et al. |
| 2005/0166143 A1 | 7/2005 | Howell |
| 2005/0216336 A1 | 9/2005 | Roberts et al. |
| 2005/0216556 A1 | 9/2005 | Manion et al. |
| 2005/0227216 A1 * | 10/2005 | Gupta ........................... 434/322 |
| 2005/0240580 A1 | 10/2005 | Zamir et al. |
| 2005/0246211 A1 | 11/2005 | Kaiser |
| 2005/0251494 A1 | 11/2005 | Maria Jansen |
| 2005/0266388 A1 | 12/2005 | Gross et al. |
| 2005/0273271 A1 | 12/2005 | Rao et al. |
| 2005/0288943 A1 | 12/2005 | Wei et al. |
| 2006/0020662 A1 | 1/2006 | Robinson |
| 2006/0031087 A1 | 2/2006 | Fox et al. |
| 2006/0052057 A1 | 3/2006 | Persson et al. |
| 2006/0062157 A1 | 3/2006 | Yamamoto |
| 2006/0089948 A1 | 4/2006 | Picker |
| 2006/0115800 A1 | 6/2006 | Daley |
| 2006/0134593 A1 | 6/2006 | Kalous et al. |
| 2006/0240856 A1 | 10/2006 | Counts et al. |
| 2006/0242234 A1 | 10/2006 | Counts et al. |
| 2006/0246197 A1 | 11/2006 | Kshirsagar et al. |
| 2006/0248197 A1 | 11/2006 | Evans et al. |
| 2006/0252547 A1 | 11/2006 | Mizrahi et al. |
| 2006/0253533 A1 | 11/2006 | Bursztein et al. |
| 2006/0253572 A1 | 11/2006 | Gomez et al. |
| 2007/0027973 A1 | 2/2007 | Stein et al. |
| 2007/0130339 A1 | 6/2007 | Alcorn et al. |
| 2007/0224585 A1 | 9/2007 | Gerteis et al. |
| 2007/0231782 A1 | 10/2007 | Ozawa et al. |
| 2007/0245349 A1 | 10/2007 | Sinn |
| 2007/0260671 A1 | 11/2007 | Harinstein et al. |
| 2008/0005188 A1 | 1/2008 | Li et al. |
| 2008/0082480 A1 | 4/2008 | Gounares et al. |
| 2008/0096519 A1 | 4/2008 | Miegel |
| 2008/0097980 A1 | 4/2008 | Sullivan |
| 2008/0126476 A1 | 5/2008 | Nicholas et al. |
| 2008/0176194 A1 | 7/2008 | Zolt et al. |
| 2009/0030876 A1 | 1/2009 | Hamilton |
| 2011/0016137 A1 | 1/2011 | Goroshevsky et al. |

(56) References Cited

U.S. PATENT DOCUMENTS

| | | | |
|---|---|---|---|
| 2014/0095619 | A1 | 4/2014 | Dozier et al. |
| 2014/0356839 | A1 | 12/2014 | Dozier et al. |
| 2017/0366633 | A1 | 12/2017 | Dozier et al. |

FOREIGN PATENT DOCUMENTS

| | | |
|---|---|---|
| JP | 2002288187 | 10/2002 |
| JP | 2001306606 | 11/2002 |
| JP | 2005128673 | 5/2005 |
| JP | 2006065734 | 9/2006 |
| WO | 2007118231 | 10/2007 |

OTHER PUBLICATIONS

U.S. Appl. No. 11/937,497, entitled "System for Developing Literacy Skills Using Loosely Coupled Tools in Self-Directed Learning Process within a Collaborative Social Network," filed Nov. 8, 2007.
Ashley Lowery, Internet Neighborhood ePALS links world with Edwardsburg, South Bend Tribune, Mar. 14, 2001.
EPALS Classroom Exchange First to Provide Teacher Monitored Email With Instant Language Translations, PR Newswire, Mar. 14, 2000.
EPALS Classroom Exchange partners with Canada's SchoolNet, Canada NewsWire, Nov. 23, 2000.
MessageLabs: British Government Takes on MessageLabs to Bolster Virus Protection, M2 Presswire, May 16, 2002.
Netopia: Netopia to bring parental control, content filtering and family security services to broadband service providers, M2 Presswire, Jun. 4, 2002.
Portions of http://www.ecs.syr.edu/organizations/AEW/ website and associated Internet Archive information.
Safety: Monitoring web access, The Guardian, Oct. 25, 2000, at 7.
Scholastic and ePALS Classroom Exchange Announce Agreement Connecting Global Classrooms, Business Wire, Aug. 10, 2000.
Zoraini Wati Abas, E-mail activities in the classroom, Computimes Malaysia, Apr. 26, 2001.
Portions of the file history of European patent application No. EP 7871417.7.
Portions of the file history of Patent Cooperation Treaty (PCT) international patent application No. PCT/IB07/04578.
Portions of the file history of Patent Cooperation Treaty (PCT) international patent application No. PCT/US07/84189.
Portions of the file history of U.S. Appl. No. 11/937,495.
Portions of the file history of U.S. Appl. No. 11/937,497.
Portions of the file history of U.S. Appl. No. 13/251,263.
United States Patent and Trademark Office, Non-Final Office Action, dated Mar. 2, 2012, U.S. Appl. No. 13/251,263, filed Oct. 2, 2011, Linda T. Dozier et al.
United States Patent and Trademark Office, Non-Final Office Action, dated Feb. 10, 2012, U.S. Appl. No. 11/937,495, filed Nov. 8, 2007, Linda T. Dozier.
United States Patent and Trademark Office, Non-Final Office Action, dated Apr. 17, 2012, U.S. Appl. No. 11/402,830, filed Apr. 13, 2006, Osmani Gomez et al.
Official Notice of Rejection dated Jan. 11, 2013 for Japanese Patent Application No. 2009-536506.
Ivan Cantador, et al.; "Multilayered Semantic Social Network Modeling by Ontology-Based User Profiles Clustering: Application to Collaborative Filtering", January 1, 2006 (Jan. 1, 2006), Managing Knowledge in a World of Networks Lecture Notes in Computer Science; Lecture Notes in Artificial Intellig Ence; LNCS, Sringer, Berlin, DE, pp. 334-349, XP019045784.
Supplementary European Search Report Issued for EP Patent Application No. EP07871417 dated Feb. 12, 2013.
Office Action dated Jul. 8, 2014 in U.S. Appl. No. 14/050,418, filed Oct. 10, 2013.
Response filed Apr. 24, 2014 to Notice of Rejection dated Dec. 24, 2013 in Japanese Application No. 2012-271707, filed Dec. 12, 2012.
Response filed Jun. 18, 2014 to Office Action dated Dec. 18, 2013 in U.S. Appl. No. 11/937,495, filed Nov. 8, 2007.
Response filed Jun. 18, 2014 to Office Action dated Dec. 18, 2013 in U.S. Appl. No. 13/251,263, filed Oct. 2, 2011.
Japanese Patent Office, Notice of Rejection, dated Dec. 24, 2013, Japanese Application No. 2012-271707, filed Dec. 12, 2012, ePals, Inc.
United States Patent and Trademark Office, Final Office Action, dated Dec. 18, 2013, U.S. Appl. No. 11/937,495, filed Nov. 8, 2007, Linda Dozier, et al.
United States Patent and Trademark Office, Non-Final Office Action, dated Dec. 18, 2013, U.S. Appl. No. 13/251,263, filed Oct. 2, 2011, Linda Dozier, et al.
Office Action dated Dec. 10, 2014 in U.S. Appl. No. 13/251,263, filed Oct. 2, 2011.
Response filed Mar. 11, 2015 to Office Action dated Sep. 11, 2014 in U.S. Appl. No. 11/937,495, filed Nov. 8, 2007.
Response filed Apr. 8, 2015 to Office Action dated Oct. 9, 2014 in U.S. Appl. No. 14/255,334, filed Apr. 17, 2014.
Office Aciton dated May 6, 2015 in U.S. Appl. No. 14/050,418, filed Apr. 17, 2014.
Office Action dated Aug. 27, 2014 in U.S. Appl. No. 11/937,497, filed Nov. 8, 2007.
Office Action dated Sep. 11, 2014 in U.S. Appl. No. 11/937,495, filed Nov. 8, 2007.
Office Action dated Oct. 9, 2014 in U.S. Appl. No. 14/255,334, filed Apr. 17, 2014.
United States Patent and Trademark Office, Final Office Action, dated Jun. 10, 2015, U.S. Appl. No. 11/937,497, filed Nov. 8, 2007, Nina Zolt et al.
United States Patent and Trademark Office, Final Office Action, dated Jul. 8, 2015, U.S. Appl. No. 11/937,495, filed Nov. 8, 2007, Linda T. Dozier et al.
United States Patent and Trademark Office, Final Office Action, dated Jul. 31, 2015, U.S. Appl. No. 14/255,334, filed Apr. 17, 2014, Linda T. Dozier et al.
United States Patent and Trademark Office, Non-Final Office Action, dated Dec. 11, 2015, U.S. Appl. No. 13/251,263, filed Oct. 2, 2011, Linda T. Dozier et al.
Non-Final Office Action, dated Mar. 3, 2017, U.S. Appl. No. 15/360,744, filed Nov. 23, 2016, Linda T. Dozier, et al.
Response to Final Office Action, dated Jul. 8, 2015, U.S. Appl. No. 11/937,495, filed Nov. 8, 2007, Linda T. Dozier, et al.
Non-Final Office Action, dated Jun. 16, 2016, U.S. Appl. No. 11/937,495, filed Nov. 8, 2007, Linda T. Dozier, et al.
Response to Non-Final Office Action, dated Jun. 16, 2016, U.S. Appl. No. 11/937,495, filed Nov. 8, 2007, Linda T. Dozier, et al.
Non-Final Office Action, dated Apr. 28, 2017, U.S. Appl. No. 11/937,495, filed Nov. 8, 2007, Linda T. Dozier, et al.
Response to Non-Final Office Action, dated Apr. 28, 2017, U.S. Appl. No. 11/937,495, filed Nov. 8, 2007, Linda T. Dozier, et al.
Final Office Action, dated Nov. 17, 2017, U.S. Appl. No. 11/937,495, filed Nov. 8, 2007, Linda T. Dozier, et al.
Response to Final Office Action, dated Nov. 17, 2017, U.S. Appl. No. 11/937,495, filed Nov. 8, 2007, Linda T. Dozier, et al.
Non-Final Office Action, dated Feb. 26, 2019, U.S. Appl. No. 11/937,495, filed Nov. 8, 2007, Linda T. Dozier, et al.
Response to Final Office Action, dated May 6, 2015, U.S. Appl. No. 14/050,418, filed Oct. 10, 2013, Linda T. Dozier, et al.
Non-Final Office Action, dated May 24, 2016, U.S. Appl. No. 14/050,418, filed Oct. 10, 2011, Linda T. Dozier, et al.
Response to Final Office Action, dated Dec. 10, 2014, U.S. Appl. No. 13/251,263, filed Oct. 2, 2011, Linda T. Dozier, et al.
Non-Final Office Action, dated Dec. 11, 2015, U.S. Appl. No. 13/251,263, filed Oct. 2, 2011, Linda T. Dozier, et al.
Response to Non-Final Office Action, dated Dec. 11, 2015, U.S. Appl. No. 13/251,263, filed Oct. 2, 2011, Linda T. Dozier, et al.
Final Office Action, dated Jul. 5, 2016, U.S. Appl. No. 13/251,263, filed Oct. 2, 2011, Linda T. Dozier, et al.

(56) References Cited

OTHER PUBLICATIONS

Response to Final Office Action, dated Jul. 5, 2016, U.S. Appl. No. 13/251,263, filed Oct. 2, 2011, Linda T. Dozier, et al.

* cited by examiner

METHOD AND SYSTEM FOR DEVELOPING PROCESS, PROJECT OR PROBLEM-BASED LEARNING SYSTEMS WITHIN A SEMANTIC COLLABORATIVE SOCIAL NETWORK

CLAIM OF PRIORITY

The present application claims the benefit of U.S. provisional applications Nos. 60/857,560; 60/857,570; and 60/857,583, all filed on Nov. 8, 2006 by Gilburne et al., the entire disclosures of which are incorporated by reference herein in their entirety.

FIELD OF THE INVENTION

The present invention relates generally to methods and systems of learning systems and, specifically, to a method and system for implementing process, problem, or project-based learning within a semantically-connected social network.

BACKGROUND OF THE INVENTION

Traditional learning management systems ("LMSs") provide an integrated system with tools to organize and administer electronic learning courses. Activities and materials managed by an LMS usually include enrollment, management of assignments, lesson plans, syllabi, discussion forums, file sharing, chats, etc. Contrary to the present invention, traditional LMSs focus on the administration of enrollment and curriculum rather than on management of the participants engaged in a problem or project-based learning process within a social network. Such systems are unable to establish learning relationships between individuals as contrasted with enrollment in a course. Such systems are unable to establish an explicit indication of a learning relationship. Such systems are unable to monitor and provide feedback regarding the participation between people in a social network who have established a learning relationship.

Most social networks are organized for self-expression and are not used as platforms for coordinating collaborative learning activities. Although many technologies that are used for social networking, such as wikis and weblogs, and profiles, are readily available, social networks with embedded curricula or that specifically address online learning using these technologies, have not been established.

Again, contrary to the present invention, traditional Learning Management Systems generally support lesson-oriented curricula rather than providing a framework and tools for self-directed acquisition of knowledge within a network of content and participants in network for learning.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 5 through 16 are graphical representations of an interface of a system for developing literacy skills in accordance with an embodiment of the present invention;

Figure 1:
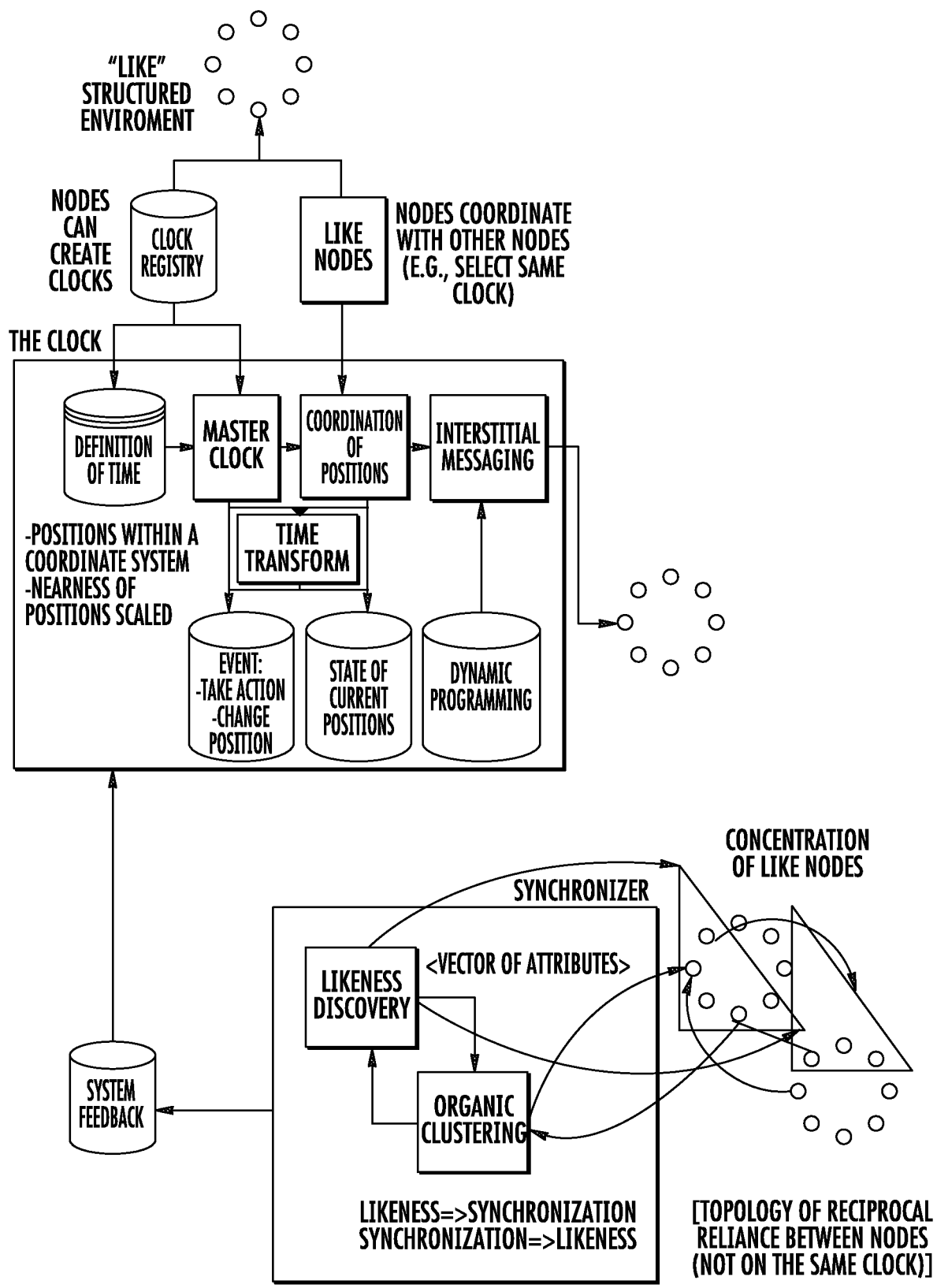
FIG. 1 is a flowchart of an exemplary system for establishing meaningful connections between nodes on a network and allowing synchronization thereof.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

This invention generally relates to a system and method of delivering a dynamic, process-based learning experience using computers, storage, and networks to coordinate, record, and manage the state transitions between participants. Specifically, the invention relates to process-based learning systems involving methods of dynamic interaction between participants in a collaborative social network where content, presentation, curriculum, and/or the like are tailored to the participants and their roles in the social network.

This invention generally relates to systems and methods of establishing meaningful connections between nodes on a network and allowing synchronization of those nodes.

The present invention is a system and related method for establishing meaningful connections between nodes on a network. The invention allows reliable information to be made available to the nodes, such that computers and networks measure similarity between nodes at a particular point in time.

While the invention has many different applications, one specific embodiment relates to a system and method of creating and operating a social learning network. For the purposes of this example and the present disclosure, copending patent application entitled "System for Developing Literacy Skills Using Loosely Coupled Tools in a Self-Directed Learning Process Within a Collaborative Social Network", filed simultaneously herewith and bearing U.S. application Ser. No. 11/937,497, is incorporated herein in its entirety. The present system and method may be incorporated, in one embodiment, into the learning process within the collaborative social network described therein.

Generally speaking, a "node" should usually have unique identifying characteristics, be capable of receiving information, and be capable of communicating, displaying, acting, or otherwise using information. Generally, in the present method and system, the node must be "registered" at some point. This usually requires that the node be identified in some manner and then information should be received about the node. At some point, the needs of the node will be determined. Those needs could be determined based on characteristics of the node; sequences of events, triggers, or actions related to the node; or by comparison of similarly-situation nodes. The needs, in the present system, can be self-updating and can be defined by a cycle of repeating steps and assessments.

The needs of the node(s) are then mapped into an orientation of one or more events. Of course, the orientation and map can be constantly changing, which would change the ultimate synchronization at times. Once the orientation and synchronization has been determined, then the nodes can be handled in various ways. Among the ways that the nodes can be addressed include delivering satisfaction of the nodes' needs, notifying of other nodes having the same or similar needs or orientation, establishing communication between the node and similarly-situation node(s), or converting similarly-situation node(s). The system may then move on to the next state after the option has been presented and/or addressed to the node, after the passage of a certain amount of time, or after the occurring of an external event.

Therefore, the present system and method is a dynamic system which is constantly and continuously changing. In particular, the needs set and the orientation set are continuously changing. The vector of attributes changes based on behavior and events.

However, the present invention allows the "clocks" to be set for distributed nodes based on these continuously changing vectors. The "clock is set" by the present method by putting all the nodes in the same state; defining similar needs and attribute sets; and providing similarly-situation (or "synchronized") nodes with similar or the same options. The synchronization of the present method actually allows coordination of the nodes by providing a synchronous relationship on top of asynchronous relationships.

In the particular embodiment described herein as an example, the "nodes" of the system are the participants themselves. In the social learning network, definitions of "nearness" that might affect similarity include attributes related to participants such as the participant's position in learning cycle; the titles and/or genres of books being read or the subject matter of the projects being undertaken; the ages, grades, and skill levels of the participants; and the participant's language, location, etc. The informative attributes being tracked by the system can be any attribute or characteristic of a participant in the social learning network, any aspect of the material to be learned, or any other point that can be objectively defined.

Definitions of "time" in relation to the nodes of each network can be different for each participant, but a master clock relates these to Universal Time and establishes metrics to determine which clocks of each node are similar. This invention also creates a matrix of pairwise "distances" between each set of nodes under consideration. Creation of such a matrix enables concepts of either metric or non-metric multidimensional scaling to be used to visualize the data and select clusters, to which the system can send or receive multimedia content, messages, or information about resources on the web.

Referring to FIG. 1, an exemplary system is shown that manages connections between nodes in a learning community connected by a wide area network. The system identifies clusters among the nodes that share similar attributes, sends or receives content or links to content to those nodes, and passes information to the nodes to let them know they are part of a particular cluster.

A set of nodes in the network can be thought of as a tensor field, composed of vectors that each embodies coordinates of similarly measured attributes such as space and time, arbitrarily defined. Distance between two vectors can be expressed by the metric tensor, a tensor of rank 2 (i.e. a matrix). Consider a general vector $x=[x_1 \ x_2 \ \ldots \ ]$. The distance between two vectors in matrix form is $$(\Delta s)^2 = \begin{bmatrix} g_{11} & g_{12} \\ g_{21} & g_{22} \end{bmatrix} \times [[\Delta x_1 \ \Delta x_2] \circ [\Delta x_1 \ \Delta x_2]]$$

The system is configurable with regards to the definition of the x's and the value of the g's.

Time in the synchronization is defined fundamentally by the cycles of the participants in the social learning network. As in all definitions of time, the social learning network goes through cycles, which are progressions during which participants go through sequences of independent and interdependent actions at superimposed scales. The definition of time and the position on the clock is based on an n-element time vector, whose distances from other clocks' positions can be calculated.

The system thus includes a master clock that can transform the time definition for a participant in the social learning network into Universal Time, and the synchronizer coordinates positions of participants who are operating in the context of their own clocks. When an event occurs, i.e. a state change or transition, the positions and their distances are reevaluated. Positions and/or events may change based on interaction with, or attributes of, nodes unrelated to the same clock. Therefore, the system keeps track of which participants or sub-networks are nearest one another and are, therefore, candidates for likeness discovery and clustering. The coordinated nodes each have a vector of dynamic attributes that are not necessarily predefined, but which can be dynamically defined based on a particular set of coordinates for a social learning network, i.e., choosing the set of x's and the value of the g's in the equation above. Previously unsynchronized attributes may change based on interactions between nodes.

Computational efficiency in analyzing such complicated relationships requires reducing the dimensionality of the problem, i.e., representing the data in a smaller number of dimensions. Several techniques may be used, and experience with the system enables the analyses to be refined. One technique is multidimensional scaling which, in its simplest form, starts with a matrix of pairwise distances between the nodes and not the nodes' coordinates. These pairwise distances are possibly scaled or possibly asymmetric. The relative magnitudes of the eigenvalues of this distance matrix indicate which columns of the matrix contributes most to the estimation of the position of the nodes based only on the pairwise distances. When several of these eigenvalues are much larger than the rest, then the corresponding columns provide a lower-dimensional representation that adequately describes the data. The concept is extended to varying weights and missing data, and includes nonlinearities and categorical variables. Once coordinates in the particular spacetime of the network are established, multidimensional Voronoi diagrams and their duals, Delaunay triangulation, are used to keep track of the magnitude of readjustment needed when a node changes state.

Once clusters of similarity are identified, the system targets information to those nodes. Information includes a notification that each node is part of a particular cluster, along with content, and links to additional content that is related to the focus of the cluster. The system may also receive information from each node that changes the node's state, Universal Time, or clustering of the nodes.

In the particular embodiment where the reading of books by mentors and students is the type of learning activity involved in the present system, the following "clocks" exist and are synchronized according to the present method. The simultaneity between all of the clocks helps provide a rich and unique experience for each student who is communicating, generally in writing with a mentor or "pen pal" about the subject matter of the jointly-read book. For example, the Genre Clock is timed to the various stages of the cycle and the specific genre; the Pen Pal Pairs Clock is timed according to the actual timing of pen pal deliveries in the cycle; the Individual Pen Pal Clock reflects the particular interests and activities of a specific pen pal; and the Community Clock provides an ongoing assortment of community related activities that may or may not be related to the genre or the pen pal's stage in a cycle.

The Genre Clock

All participants may follow the same genre sequence so there will be a set of genre-related information and activities that each participant is offered when they reach a particular point in the cycle. For example, a week after a pen pal receives a book to read, the system operator portion of the method will remind the pen pal to check out "About the Book" for additional information about the book. As another example, when a pen pal is waiting for their pen pal's letter, the pen pal may be asked to participate in a subject-related field trip.

The Pen Pal Pair Clock

Each pen pal pair will have its own schedule and individual cycles will flow according to the book selection dates, the reading of the book, and the transfer and receipt of letters between the pen pal ("mentor") and student. Each pen pal pair cycle may take a different amount of time. Every sign-on by every pen pal will be unique because the website will always reflect where a pen pal is in a cycle as well as what activities and resources relate to their specific interests.

The Individual Pen Pal Clock

Although it is similar to the pen pal pair clock, the individual pen pal clock will also contain items and activities that reflect the individual pen pal's experiences and interests. For example, if the pen pal regularly completes crossword puzzles, the pen pal may be invited to participate in a cross-community crossword challenge.

The Community Clock

This is the part of the system that is constantly changing and encouraging participants to interact with the community. It includes polls, contests, live feeds, etc.

Learning often occurs in collaborative social networks that may depend on content, presentation, and curriculum. The best learning often takes places when those items are tailored to the participants in the network and when those items are tailored specifically to the participants' roles. The present invention includes a method of allowing the delivery of a dynamic, tailored, process-based learning experience that involves coordinating, recording, and managing the state transitions between the participants in the learning environment. While this method has applicability to many different learning situations, it will be described herein as an example based on improving literacy through an education network. That literacy program combines reading, subject matter content (such as social studies, science, folktales, etc.), and correspondence between students on the one hand and "pen pals" or mentors on the other. One embodiment of the methods of the present invention utilize computers, storage, and networks to achieve the goal of improved learning.

Improvement in literacy, both in reading and also in writing, is one of the world's most important educational objectives. A system of computers, storage, and networks has now been developed according to the present methods to support a literacy program that (a) utilizes books selected by students and provides professional development to teachers, (b) allows for implementation of a classroom, home, and/or after-school program, (c) provides for and manages safe correspondence between students and adult pen pals or mentors, and (d) allows a student's writing to be evaluated.

The methodology utilized by the literacy program is adaptive and dynamic, so that the system manages and records states and transitions that trigger specific actions tailored to each participant. It also manages the moderation and delivery of electronic and physical materials between participants. The participants in the program may have a variety of interdependent roles, for example student, teacher, pen pal, and parent.

The system enables parallel or non-parallel entry points for the various participants and processes those entry points to filter them according to validation and safety rules established for each user role. The validation and safety rules allow minors to participate in the learning program with approved, safe mentors who will generally be of adult or older student ages.

Figure 2A:
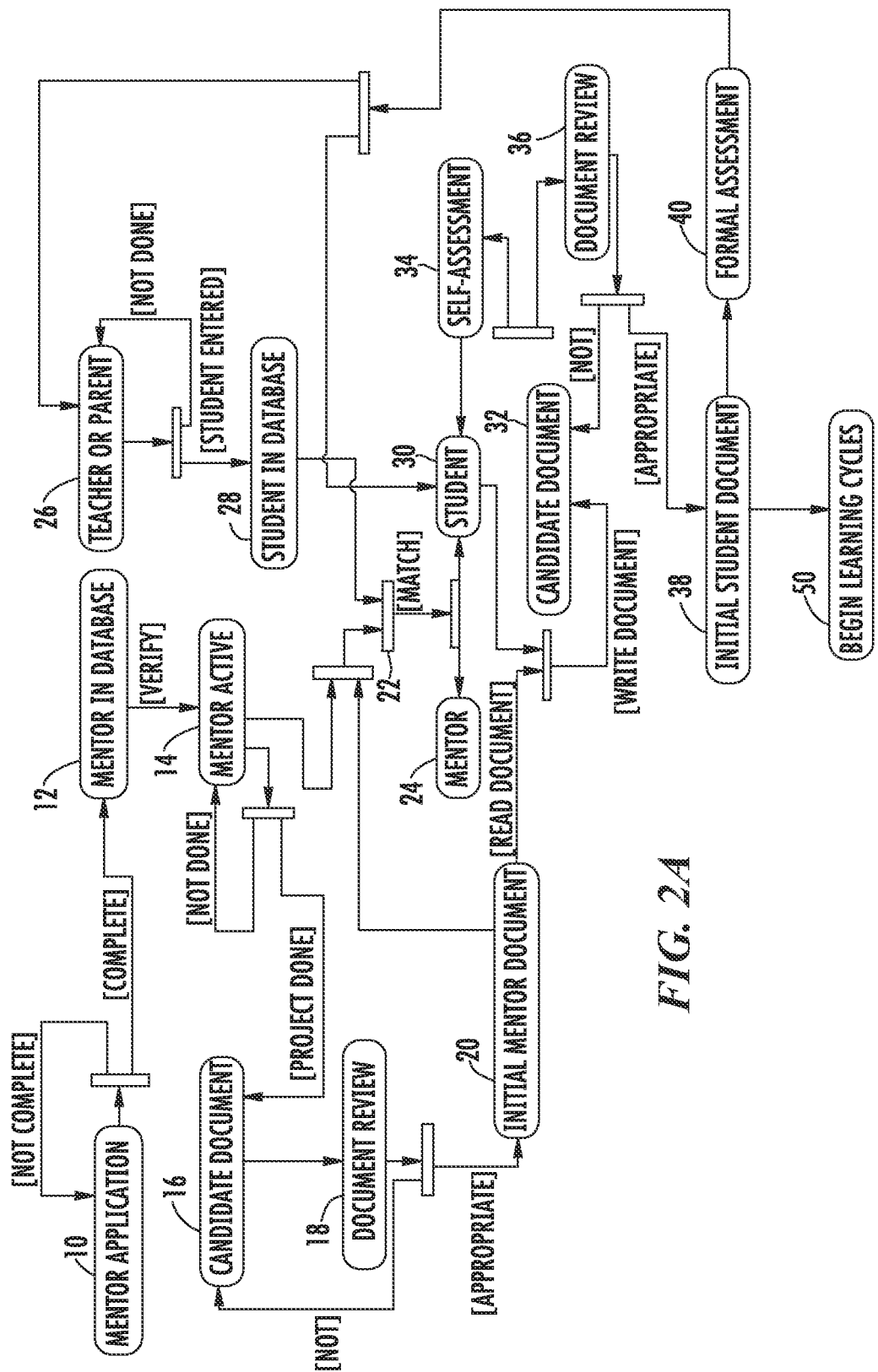
FIGS. 2A and 2B are flowcharts of a method of a system for developing literacy skills in accordance with an embodiment of the present invention.

Once validated, the participants enter a database, whereupon they are matched with a pen pal or mentor according to selectable, configurable criteria based on segmentation of populations best suited to match each participant. FIG. 2A shows the methodology of entering participants and the matching of students and mentors based on selectable criteria.

As shown in FIG. 2A, a mentor or a group of mentors enter the program by applying to participate at step 10. After the application is approved and the mentor is accepted, the mentor is then entered into a database at step 12. After verifying that the mentor is active at step 14, the mentor then participates in a project and creates a work indicative of the project at step 16. For example, the mentor may be asked to review an article, participate in a science project, or write an introductory letter applicable to a number of students, or may complete a project directed to specific subject matter on the other hand. Furthermore, the mentor may be asked to provide expert advice on a certain topic or review various materials, that originate from or that will be provided to multiple students or to other participants in the process. Alternatively, the initial project may consist solely of creating an introductory letter that will be provided to students upon their entrance to the learning network.

Once the mentor's project is completed, it is reviewed at step 18 for appropriateness. If the reviewer determines the project is not appropriate for any reason, the mentor may be asked to modify, revise, or recreate the project at step 16.

The project is then reviewed again at step 18. This cycle may occur several times and, upon completion, the mentor's project is saved at step 20. As described in more detail below, students and mentors are matched at step 22. The matching of students and mentors may be based on various similarities between the student and the mentor or, on the other hand, may be based on similarities between the mentor's project, if it's directed to a specific subject matter, and the student's interest or requirements in that particular subject matter.

In another embodiment, the mentor is not required to complete a project prior to being matched with a student as described above with respect to steps 16, 18, and 20. Instead, the mentor and student may be matched based on criteria listed above other than an initial project created by the mentor. In yet another embodiment, once the student has been matched with a mentor, they may decide on an initial project to undertake.

In addition, the relationship in this method between student and mentor is not always one-to-one. For example, a student may have multiple mentors or multiple mentors may participate together or individually to mentor a single or multiple students. The relationships set forth herein should be understood to form a collaborative network that is not necessarily based on a one-to-one relationship.

At some point, the mentor will become matched with at least one student. The student has generally been enrolled in the program by the student's parent or teacher at step 26, but situations could be provided whereby students could enroll themselves. Once entered, the student then is placed on the roster, saved in the database at step 28, and then matched with one or more mentors at step 22. The matching occurs through the use of a computer program that can match various aspects of students and mentors, including abilities, geographic locations, likes and dislikes, attributes, desires, comprehension level, etc. The matching of a mentor and student can also be based on subject matter. For example, if a student has an interest in a subject matter or is required to complete an assignment directed to that subject matter, he or she may be matched with a mentor who is knowledgeable about that subject matter or who has previously completed projects regarding the subject matter. The matching criteria can be selected by the operational programmer and can be based on any one or any set of unlimited criteria.

Once matched, the mentors, again sometimes referred to as "pen pals" because of the necessity for correspondence between the students and the mentors, and students move into an iterative cycle of reading or acquiring information, exploring related subject matter, and collaborating with similar participants in a social network who may provide expertise, are in the same phase of the learning process, or are interested in the same subjects. The student and mentor are introduced to each other through correspondence, which is generally always reviewed for appropriateness and which also may be self-assessed as many times as desired. In addition, the correspondence also goes to an assessor, who scores the quality of the correspondence for feedback to the student, teacher, pen pals, and parents. The cycle then repeats as often as is necessary or desired, perhaps using books, texts, or contents of different genres.

Specifically and still referring to FIG. 2A, the student reviews the initial mentor project, which was completed by his or her mentor and save at step 20. The student then completes a responsive project, which could be a letter, poem, report, etc., at step 32. At this point, the student may decide to perform a self-assessment cycle at step 34 where he or she may critique the completed project. The student may then decide to modify, revise, or recreate the project at step 32. This cycle may occur a number of times. At any point, the student may submit the project to be reviewed at step 36. If the reviewer determines the student's project is not appropriate, the student is allowed to modify, revise, or recreate the project at step 32. The student again has the option of performing self-assessment on the revised project as described above. If the reviewer determines the project is appropriate, it is saved at step 38. A formal assessment of the projects is completed at step 40 and transmitted to the teacher or parent responsible for the student. The student then begins the learning cycle at step 50.

Figure 2B:
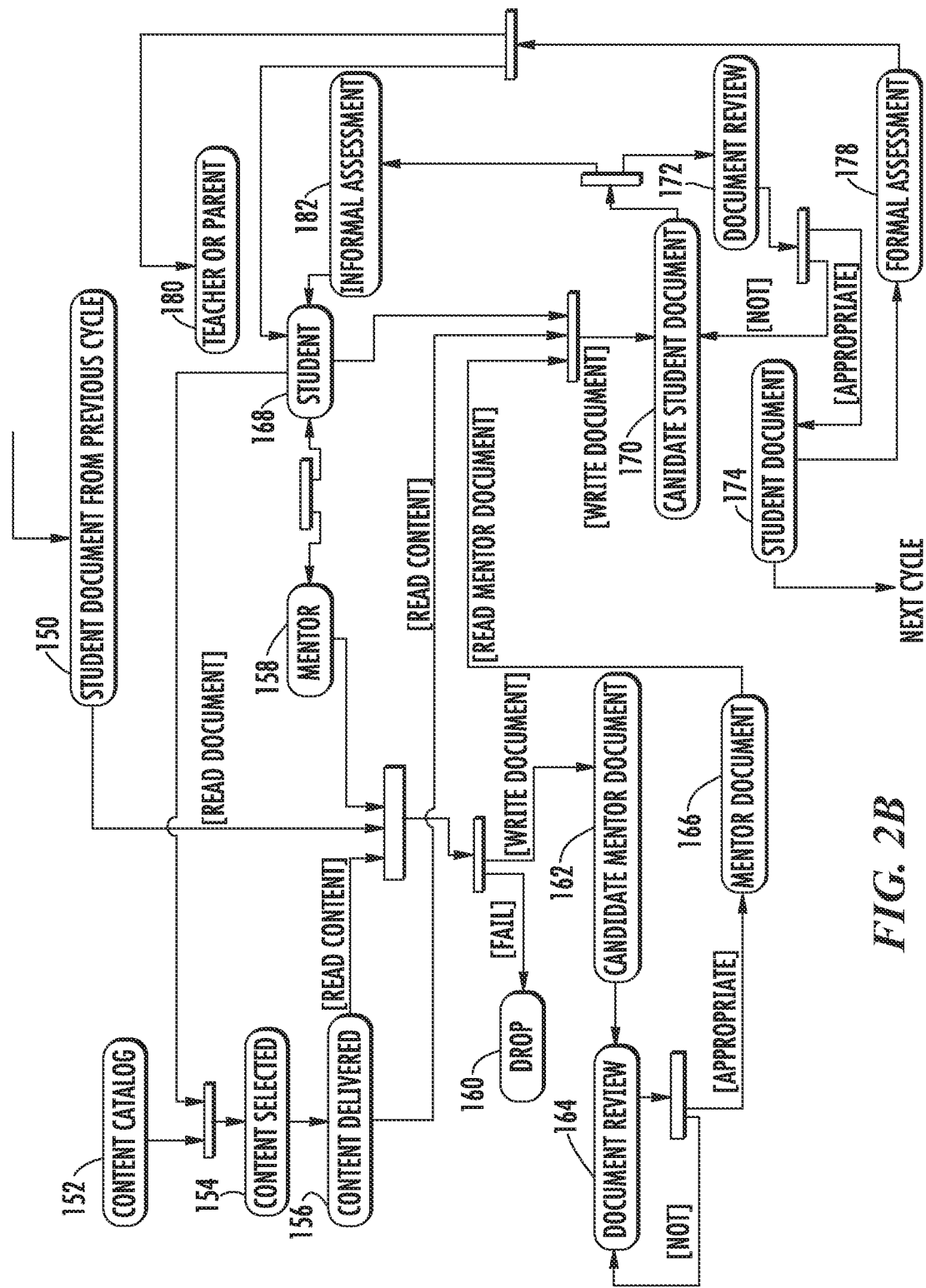

It should also be understood that the information or content being used can be books, projects, information from the news, text, artwork, or any range of multimedia. The information can be directed to a number of subjects, such as technology, science, social sciences, current events, literature, etc. The only requirement for the information is that it be reviewable and learnable by the student and mentor so that they can correspond about the subject matter of the information. Referring to FIG. 2B, a content catalog 152 contains the information used in the learning cycle, which the student reviews and analyzes in order to select subject matter in which he or she is interested at step 154. The relevant content is delivered at step 156 and is reviewed and analyzed by both the mentor and the student. The student has the option of dropping out of the process at step 160. Otherwise, the writing application guides participants through a writing process that stimulates critical thinking, which is reflected in their writing. The writing is then assessed. This process is described in more detail below.

After reading the information, extending knowledge, and collaborating, mentors submit written correspondence to the students created with a process-oriented writing application at step 162. Correspondence from the mentor is transmitted to a moderator at step 164, who is either a teacher or another entity that reviews the correspondence for appropriateness and safety. The moderator releases it to the student, modifies it, returns it to the originator for revision, or rejects it. When the moderator determines the mentor's correspondence is appropriate, the correspondence is saved at step 166.

Once the student receives the correspondence, the student goes through the same process to generate return correspondence, which also goes to the moderator for checking before being released to the pen pal/mentor. The system thus enables personalization, but preserves anonymity through the correspondence process's safety checks and balances.

This process of correspondence is also set forth in FIG. 2B wherein a student writing (which is not limited but which could include writings, composed music, project reports, newspaper articles, and anything that could be created by the student) is first created at step 170. The student-created writing is self-assessed as many times as the student desires at step 182, but then is ultimately passed through a formal review at step 172. If the reviewer determines the writing is inappropriate, it is returned to the student at step 170 to be modified, revised, or rewritten. If the reviewer determines the writing is appropriate it is saved at step 174. A formal assessment provides the teacher and/or parent with progress results at step 178. This entire cycle may be repeated to enhance and increase the learning associated with a singular work or with multiple works. If the cycle is repeated, the student at step 168 selects more content at step 154, and the process begins again.

Unique tools and processes are managed by this system to stimulate critical thinking, iteration, and the publication of writing for consumption by members of the social network.

The system records each action, or monitors the absence of action, and manages transactions accordingly or enables the triggering of transactions based on specified business rules. The tracking of the status of each participant is used to personalize their context so they know their position as they iterate through a cyclic learning process on different subjects. The system also shares this status with other participants who are related in some manner. This status is also used to personalize tools and the interface corresponding to the participant. For example, because the system "knows" that a student is currently writing about a certain subject, the writing process is tailored to the student's level, subject matter, genre of writing (e.g., poem, letter, science report), and phase of the writing process (e.g., plan, draft, revise, edit, and/or publish).

The system provides a variety of loosely coupled tools that are integrated based on the attributes of the participant and which may be used in a self-directed manner by either the student or the mentor. These unique tools include:

1. Portfolio—organizes drafts, documents, messages, notes, references, etc. Accessibility to read and write to the portfolio is integrated into the writing process.
2. Writing—an application that guides writers through a process that includes the following steps: plan, draft, revise, edit, publish, and/or send. The writing center is context-sensitive and is dynamically tailored based upon the attributes of the writer, including grade level, reading level, the number of cycles completed, genre of writing, subject matter, and preferences.
3. Assessment—a writer may request feedback on their writing at any stage during the writing process including post publication. The text will be assessed based on a rubric that measures mastery of reading comprehension, writing, and critical thinking skills within the context of a genre of writing, written dialogue between two or more participants, and subject matter content.
4. Find content—a fundamental aspect of the literacy learning process is to find and select content that two or more related participants will both read and discuss. This tool helps participants finds content of interest, keep track of them, and communicate interest in them to others (e.g., student finds a book they like and the system notifies the pen pal or parent). The "find content" or "find text" tool coordinates the selection process between related participants and provides an interface for purchasing if applicable. Upon purchase, the system sends the content to all related participants that will read and engage in online collaborative discussion(s) about the content.
5. Discovery—another integral part of the learning process is to extend and integrate new knowledge. Discovery guides participants through multimedia content that is related to the subject matter of the content they are reading. Moreover, discovery provides methods to access concentrations of content that are tailored to multiple learning styles (e.g., audio, text, interactive, etc.).
6. Learning Community—the learning process takes place within a community whose members have been verified and validated. Collaborative tools for social networking are used in a self-directed manner to make connections between people (e.g., teacher, expert). Participants may publish items to a personal blog, connect blogs using RSS feeds, send invitations to make connections at the users' discretion, and share social book marking. The network provides a platform for increasing comprehension and critical thinking through discussion and interaction. This aspect of the overall process further integrates with the learning process by providing an authentic audience and real-life purpose for self-expression and publishing.

Similarly to academic scholars, participants use this collection of process-based learning tools to discover, collaborate, critique, communicate, and stand on the shoulders of others to collectively create a network for learning. Together these tools provide a state-related and user-role-specific seamless experience for selecting content and exploring related multimedia content, as well as a writing center that integrates other subject-related resources (e.g., vocabulary, themes). The system provides an integrated process for producing creative documents that synthesize reading, writing, and critical thinking in a collaborative network.

Figure 3A:
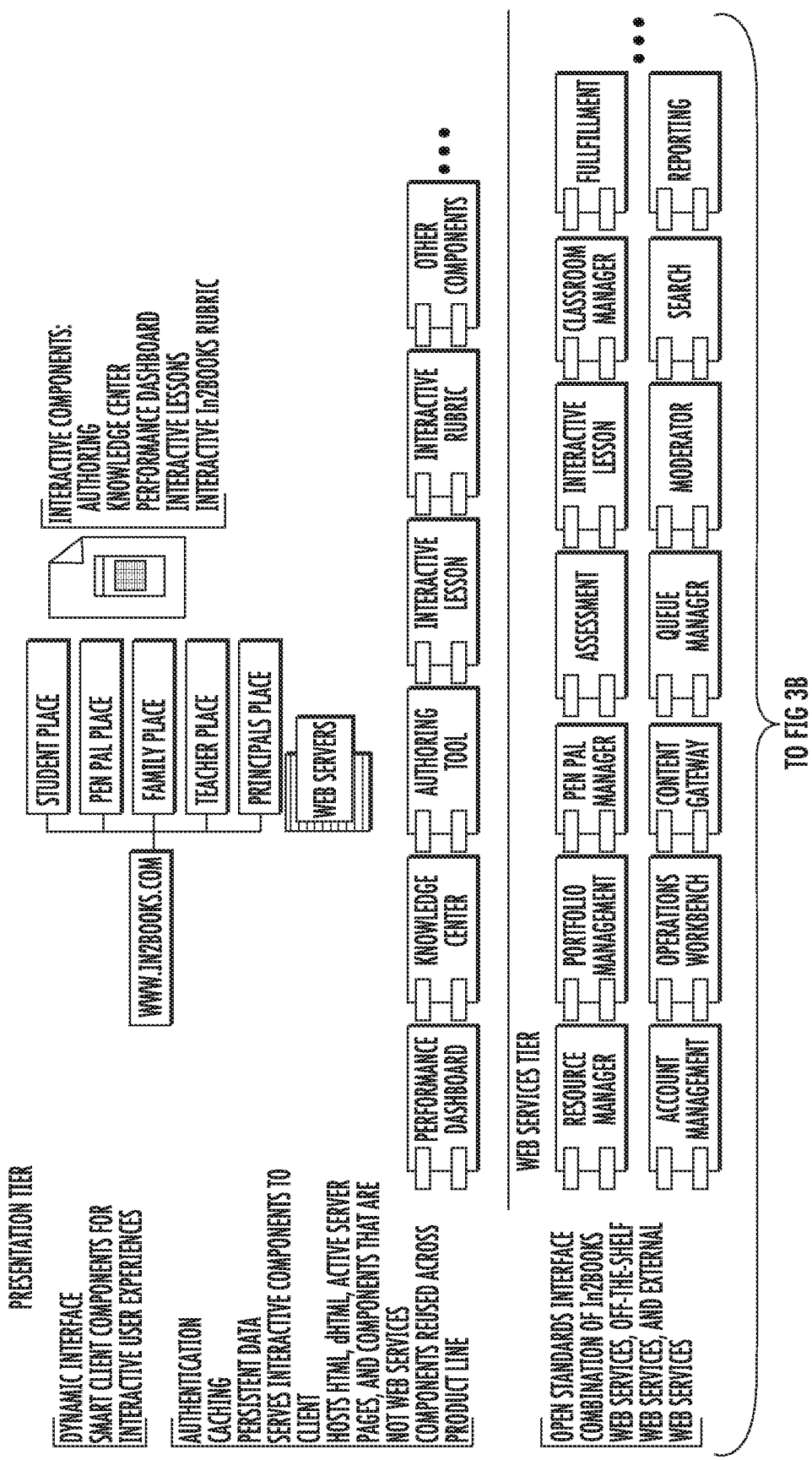
FIGS. 3 and 4 are hierarchal representations of a learning system for developing literacy skills in accordance with an embodiment of the present invention.
Figure 3B:
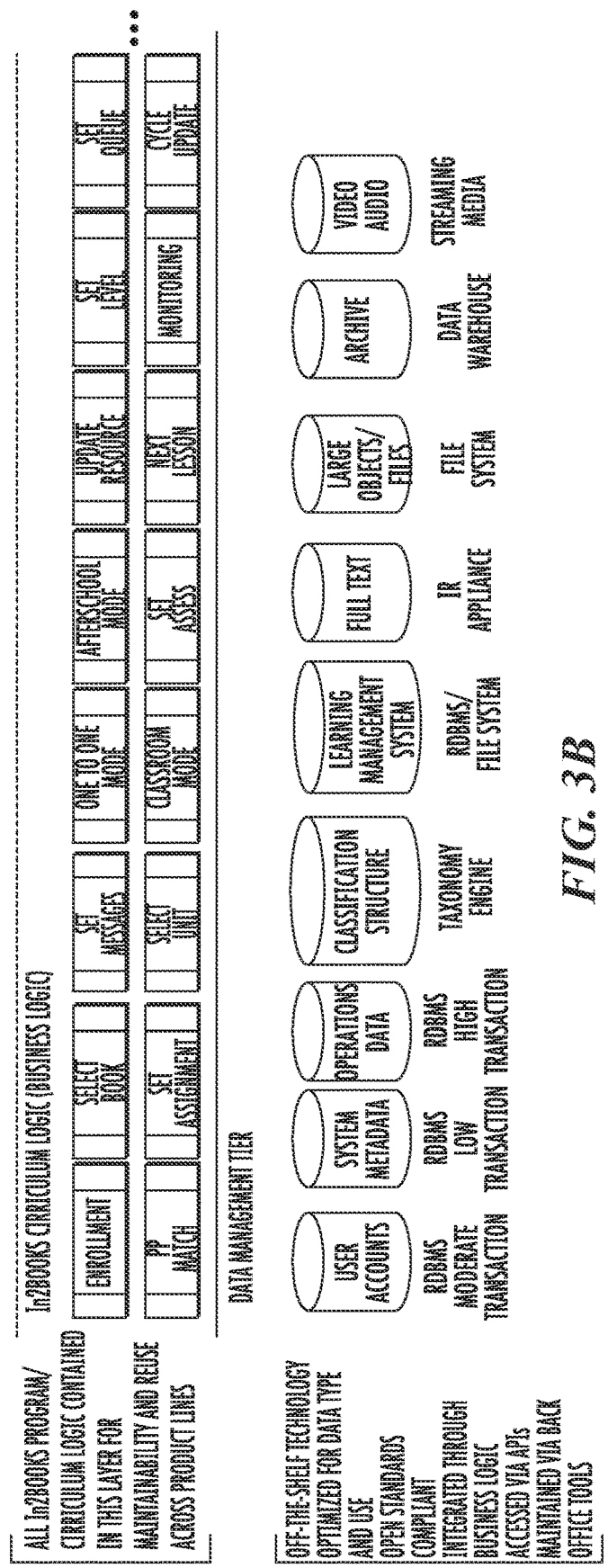
Figure 4:
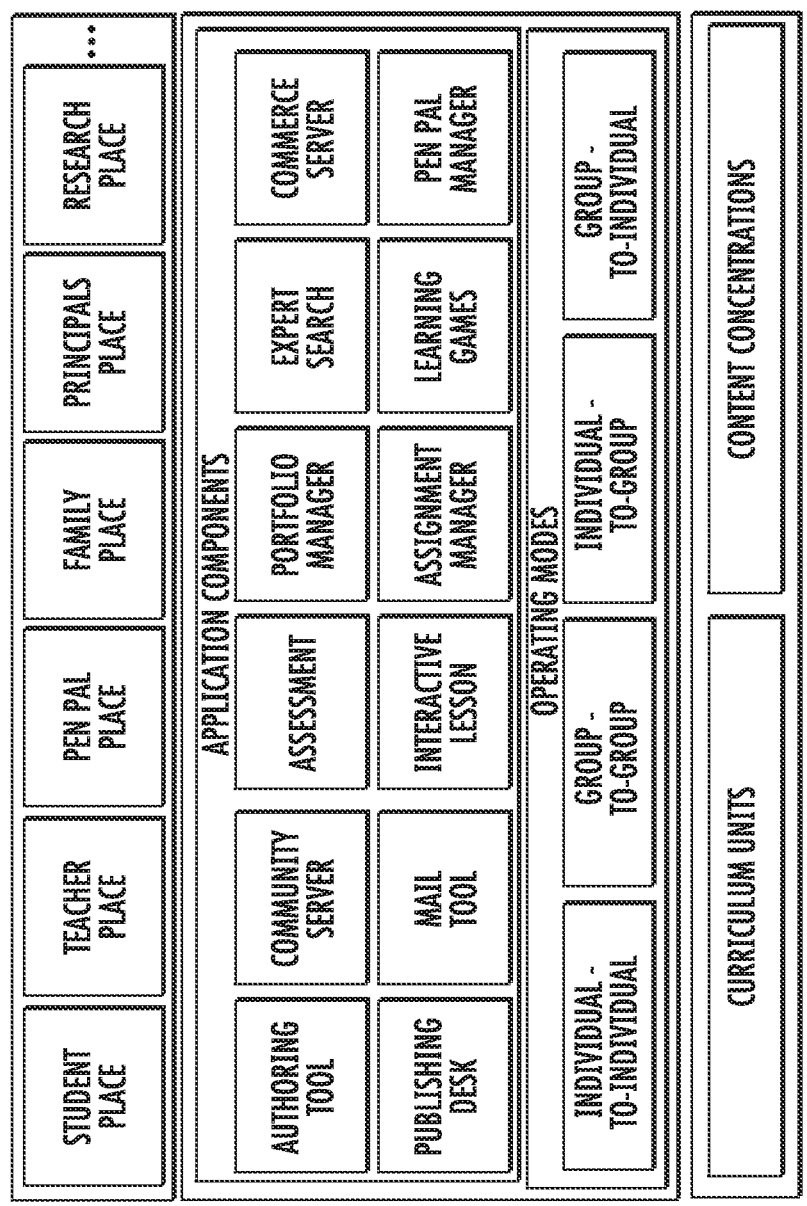

The learning system and process described above can be implemented using various technologies, including wide area networks, web servers, and logical systems. Hierarchal representations of one embodiment of a learning system implemented to make use of such technologies are set forth in FIGS. 3 and 4. Additionally, the learning process described above can be performed online or over a network. FIGS. 5 through 16 illustrate an embodiment where a graphical user interface allows a student to participate in the learning cycle and provides access to the tools described above.

Figure 5:
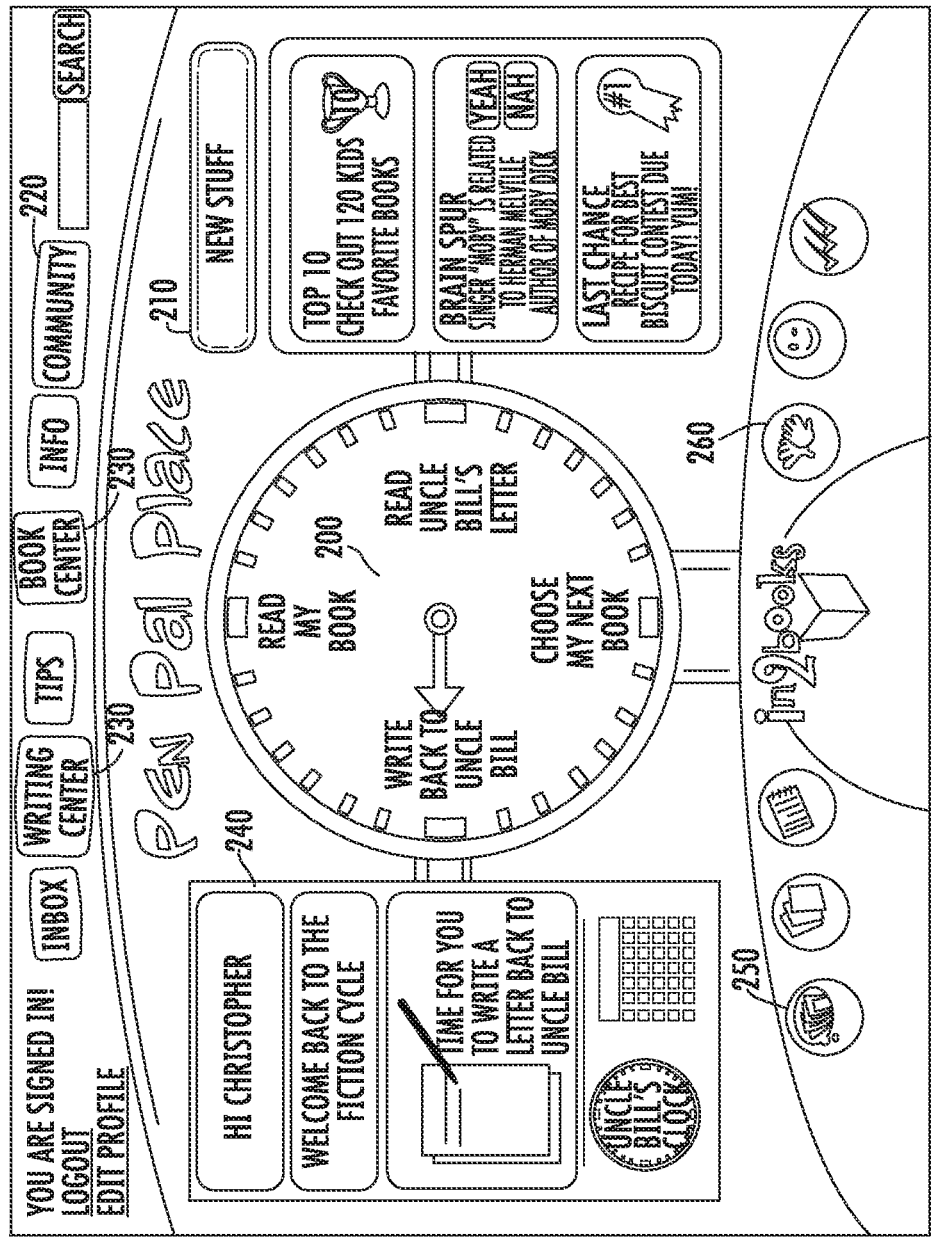
Figure 6:
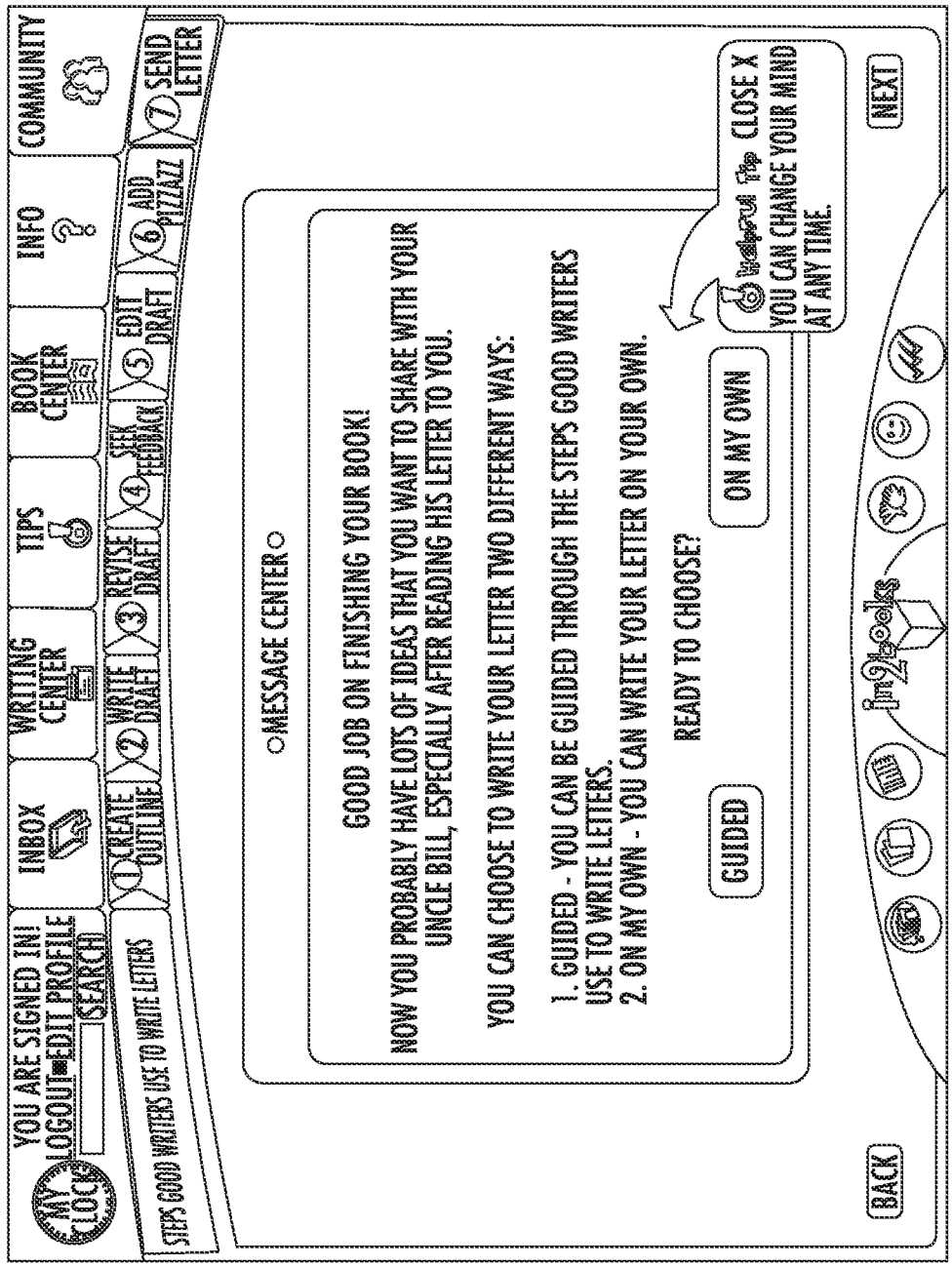
Figure 7:
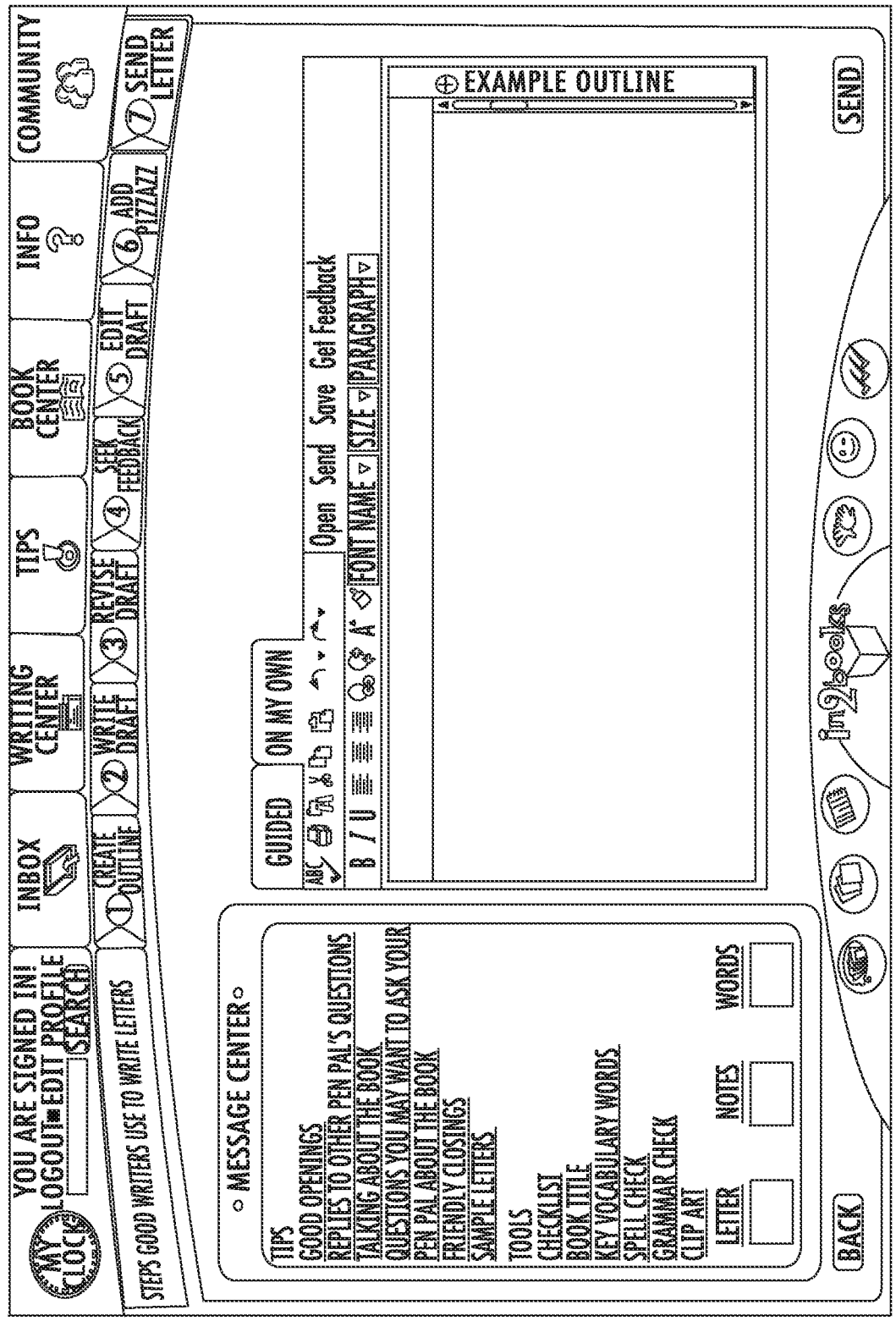
Figure 12:
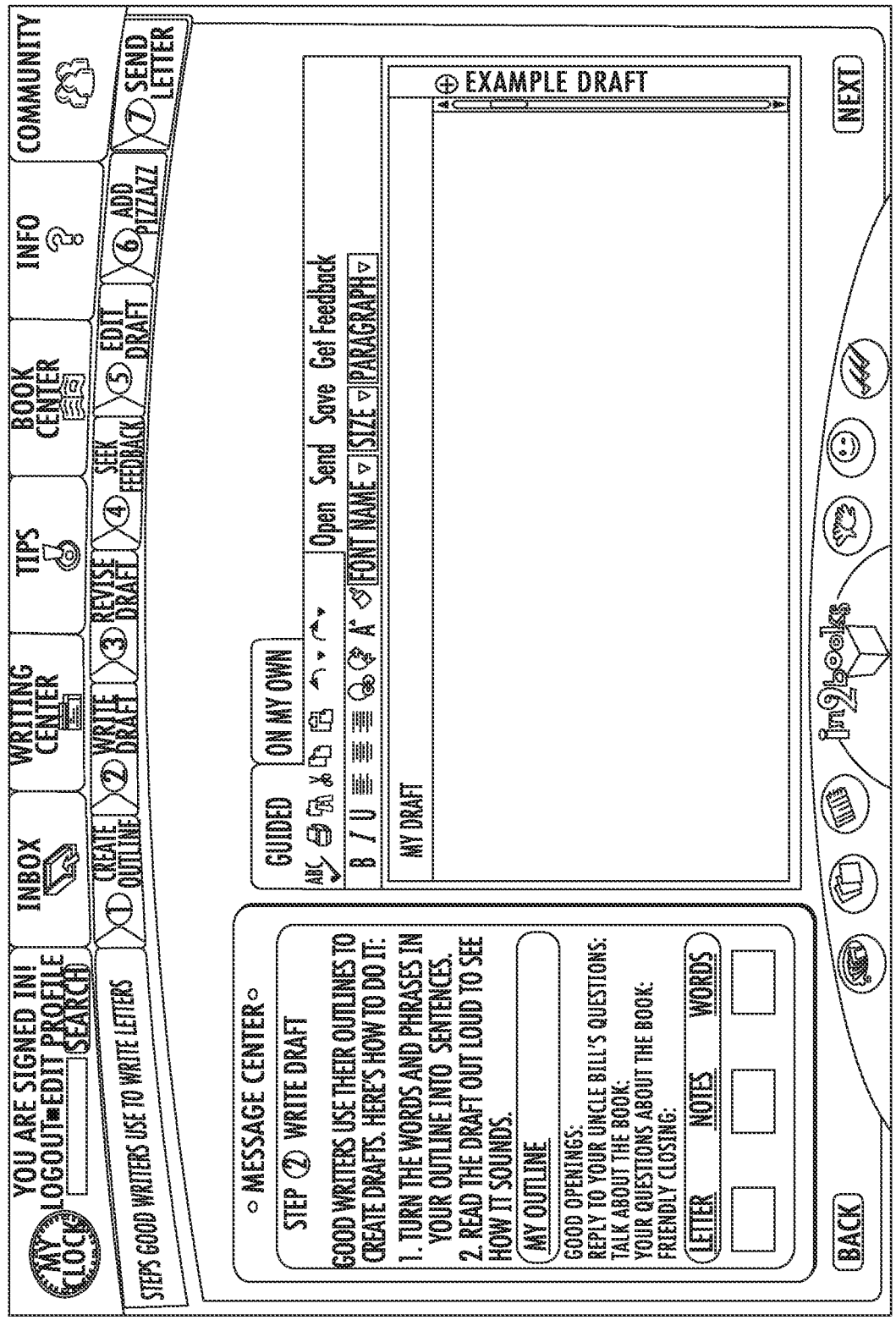
Figure 15:
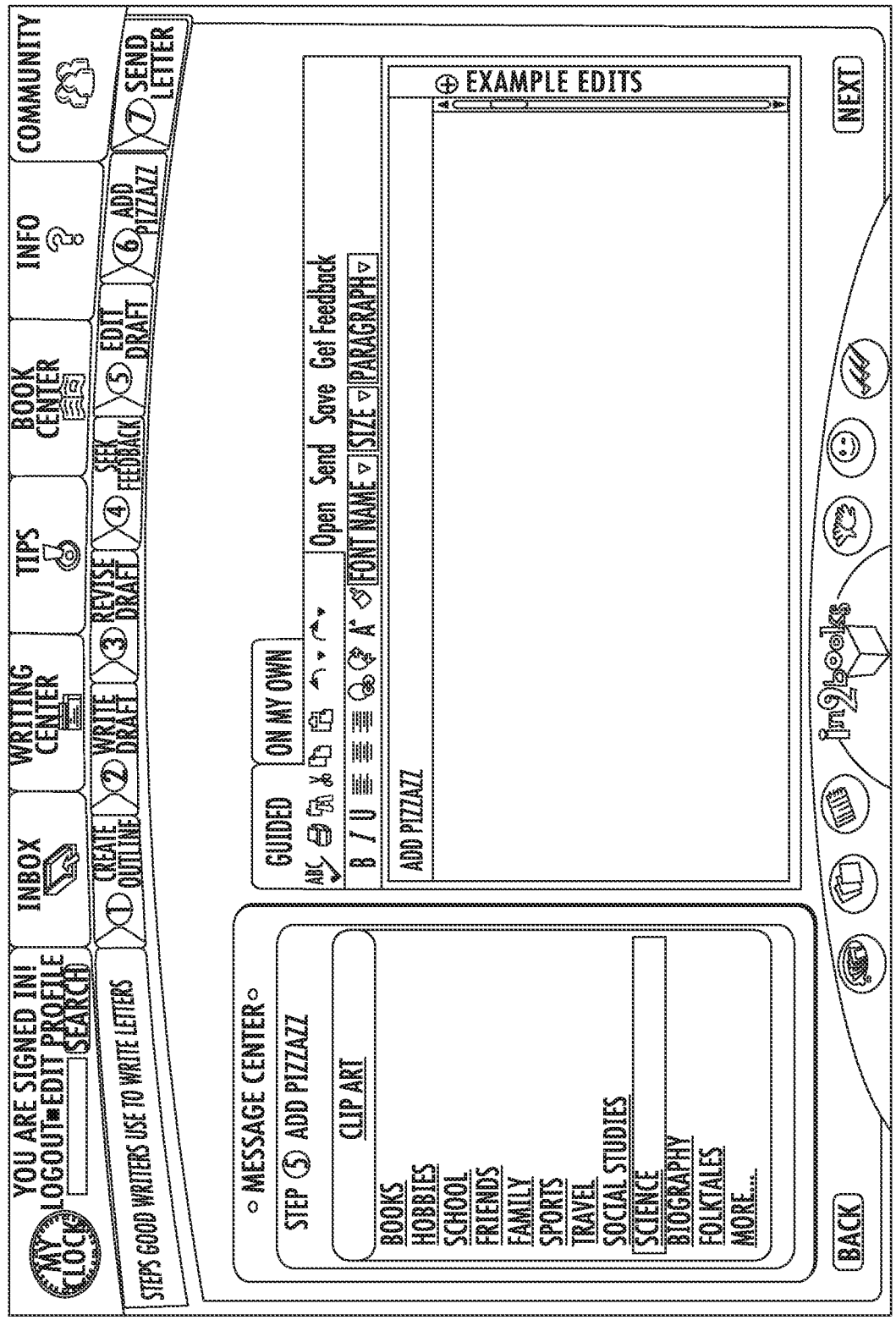
Figure 16:
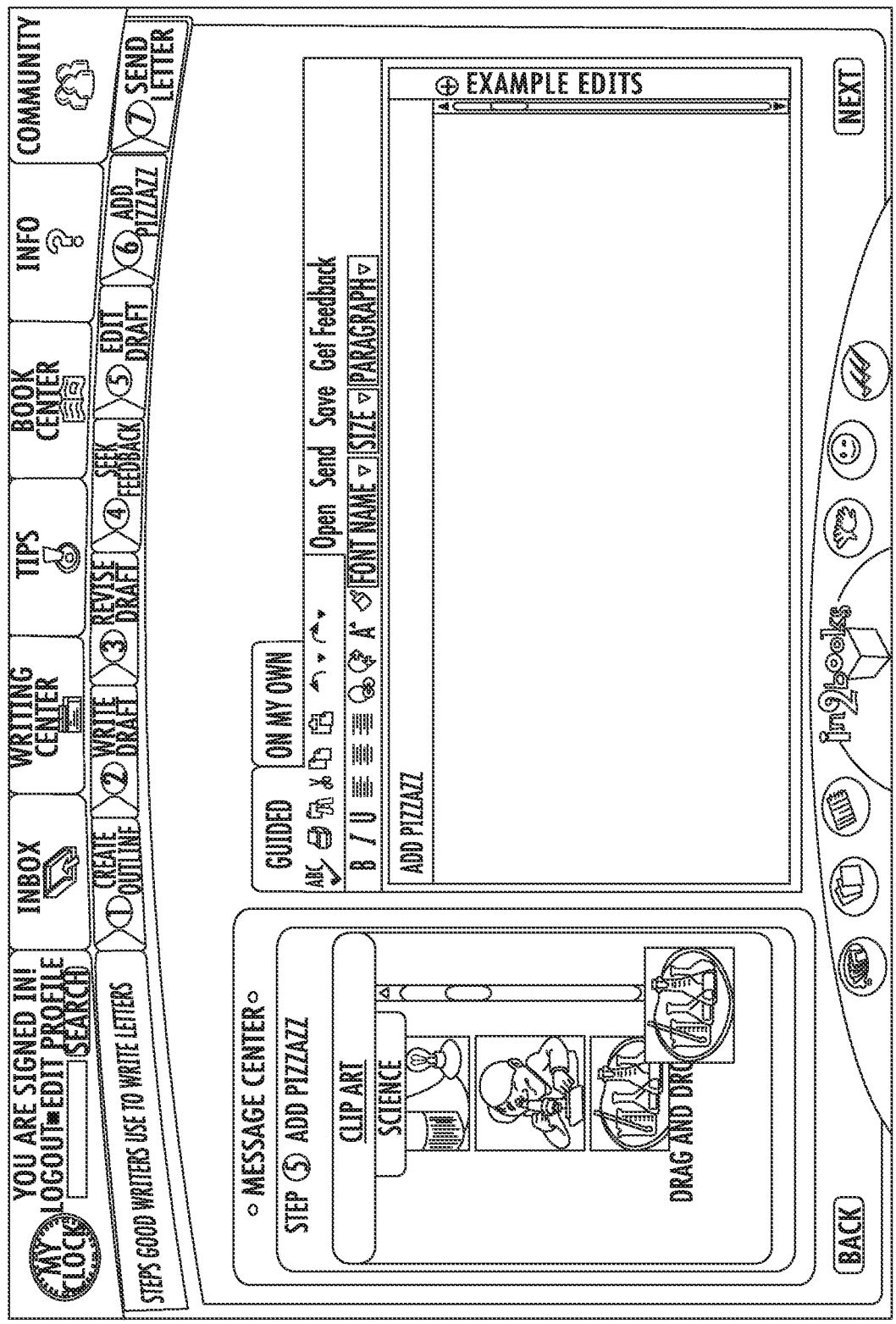

FIG. 5 exemplifies a main interface available to a student to participate in the learning network system. A main clock 200 indicates to the student the next step in the learning system process. A section 210 on the interface supplies the student with other content of interest to the student. A button 220 provides the student with access to a learning community in order to take advantage of the tools described above. A writing center button 230 provides the student with access to the writing center tools described above that provide assistance to the student in writing correspondence as shown in ensuing FIGS. 6 through 16. A section 240 identifies the student and provides the student with information specific to the student. A blog button 250 provides the student with access to "blogs" that allow the student to contribute, collaborate, and/or receive creative ideas about the learning process or the subject matter reviewed by the student. A friends button 260 allows the student to keep track of friends acquired while proceeding through the learning process. Once the student has completed the learning process with respect to one book or one project, he or she may choose another project through the use of a book center button 270. The student uses main clock 200 to keep track of his or her progress and to proceed to the next step. FIGS. 6 through 16 exemplify an interface used by the student to participate in the learning cycle once the student has completed reading or analyzing the current project. The student is guided through the creative writing process using this interface.

Example

While the present inventive method can be used in various environments, one particular environment where it is particularly effective is in the context of a program that promotes the reading of books and the writing of correspondence regarding the subject matter of such books between students and their mentor pen pals. The operating procedures for one such learning program is described herein as an example in which the present systems and methods can be utilized. As used herein, the term "program operator" refers to an actual person or to a computer program that, through the use of pre-defined software, can carry out the functions of the program operator. In addition, it should be understood that some of the functions may be carried about a real person and others may be computer-driven.

Figure 17A:
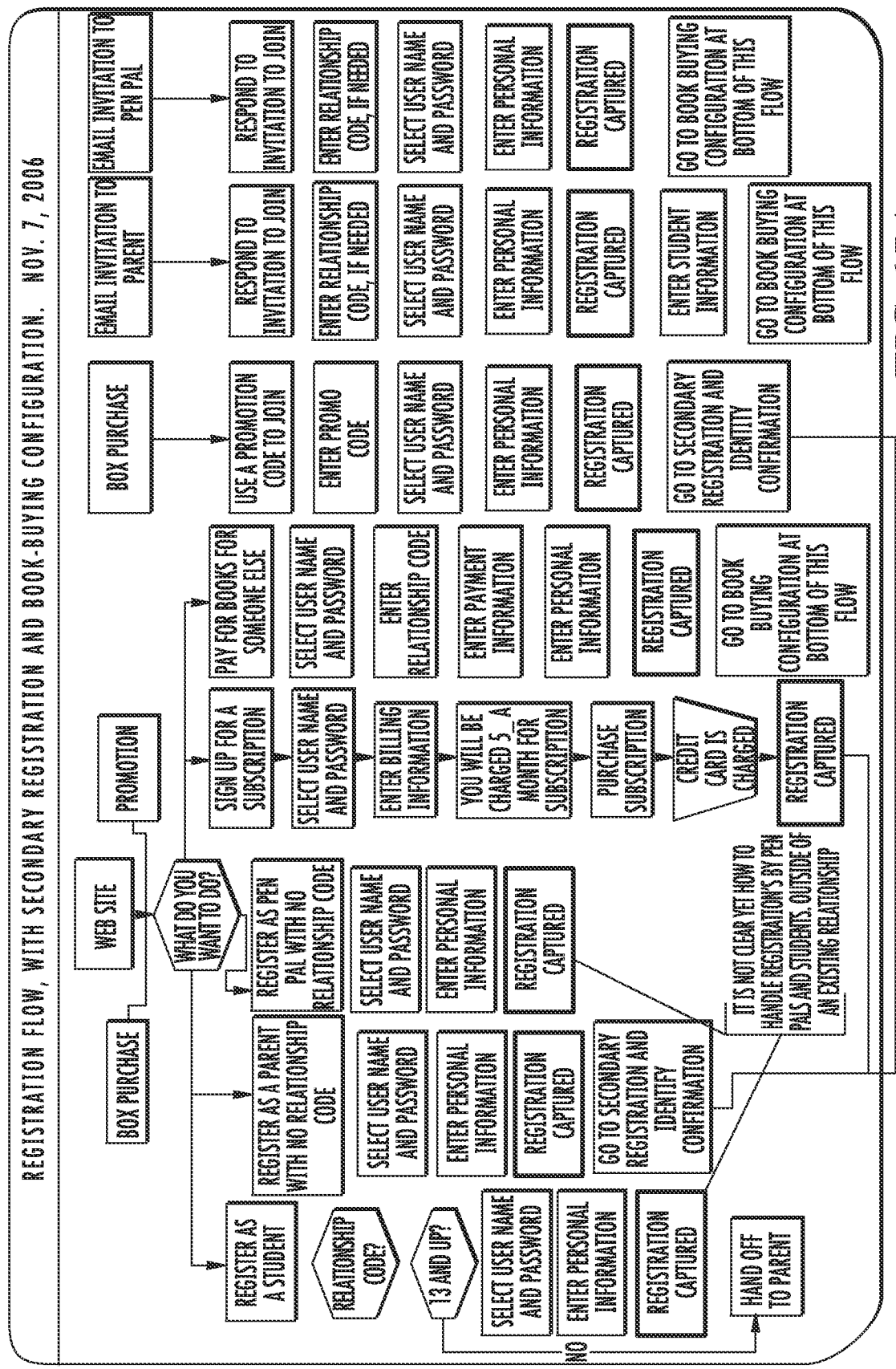
FIGS. 17A, 17B, and 17C illustrate a flowchart showing the steps of the registration flow for the program, including secondary registration and identity confirmation as well as the book buying configuration.
Figure 17B:
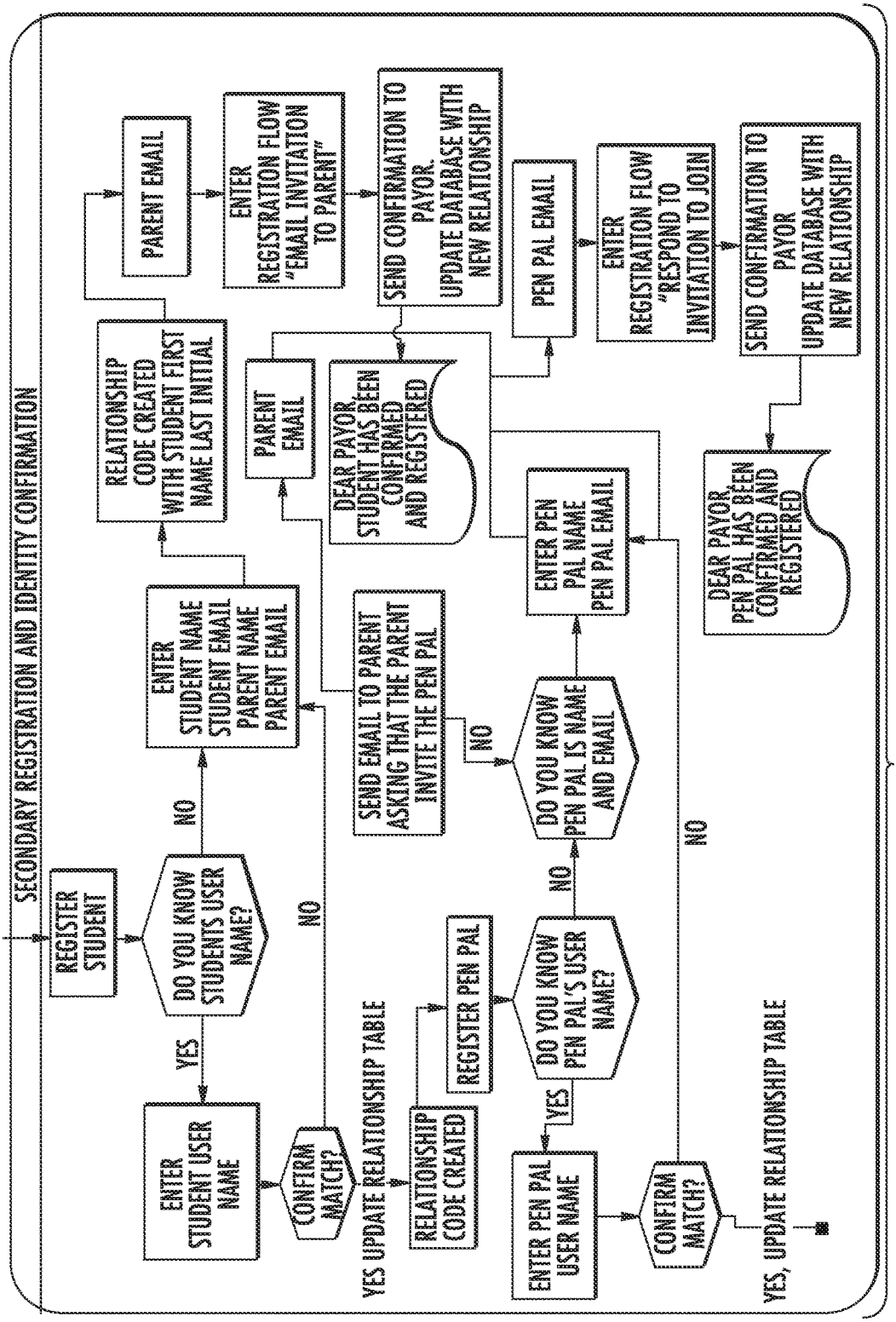
Figure 17C:
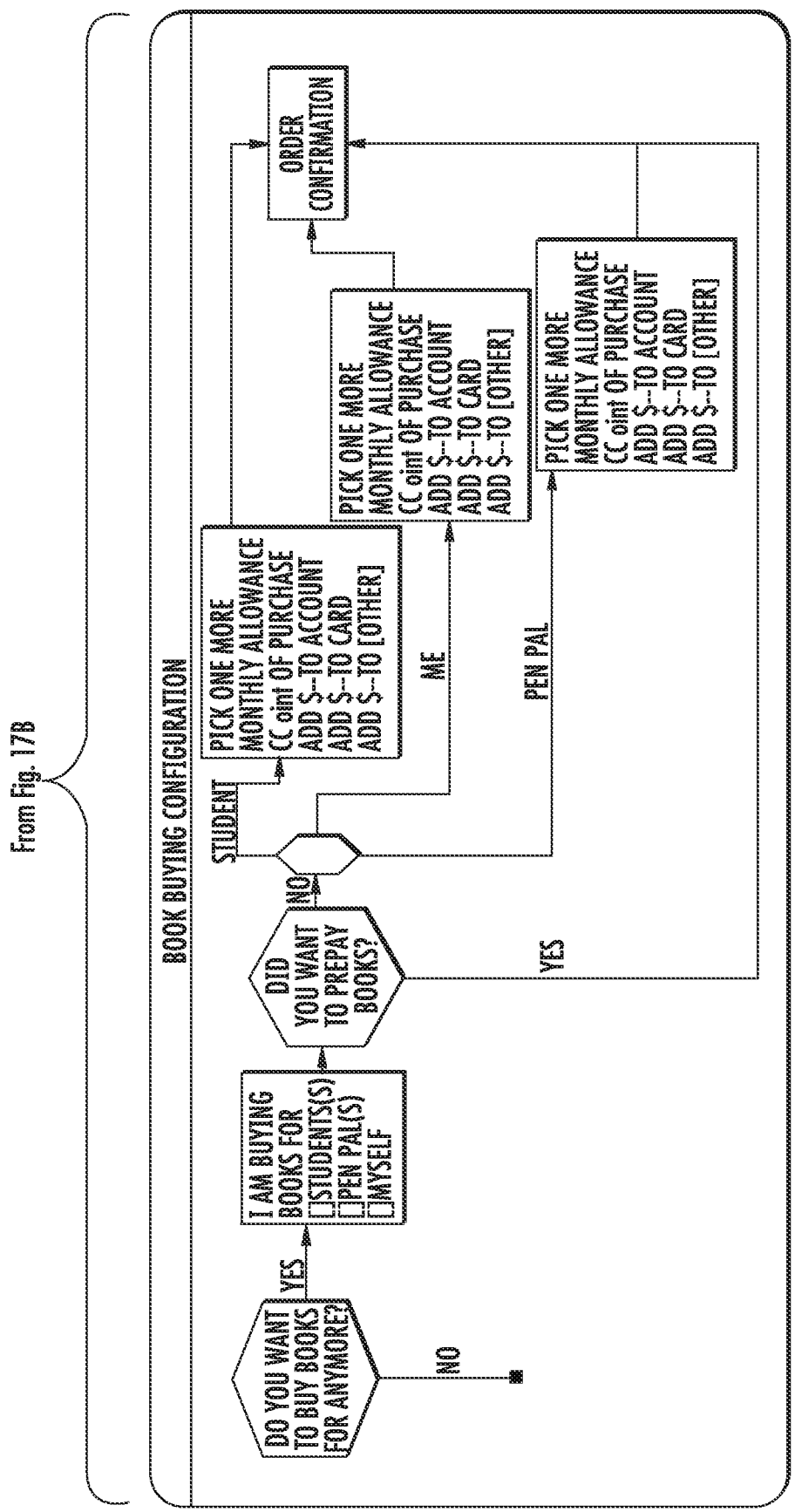

The overall process operates as follows. In general, the registration process for students and pen pals is shown graphically in the flowchart in FIG. 17. The flowchart additionally shows the process for purchasing books in the "Book Buying Configuration" portion.

First, as a prerequisite to receiving a matched student, the pen pal uploads an introductory letter to the "Workbench", which is a part of the system that administers the method of the present invention. The pen pal is then is matched to a student and the pen pal's introductory letter is uploaded to the mailbox of the matched student's teacher. Workbench alerts the teacher that the pen pal letter is available and the teacher reviews, edits if necessary, and releases the pen pal introduction letter to the matched student.

The teacher's release of the pen pal letter to the student triggers Workbench to generate auto message alerts of new mail to the student and the next Genre (for example, fiction) for Book Selection Availability to teacher/student.

The student makes the first genre book selection and sends the choice to the teacher in-box. The teacher accepts/rejects and/or overrides the student book selection and uploads the information to the Workbench. The Workbench pushes Book Selection Manifest by classroom to the Fulfillment Center.

Figure 18A:
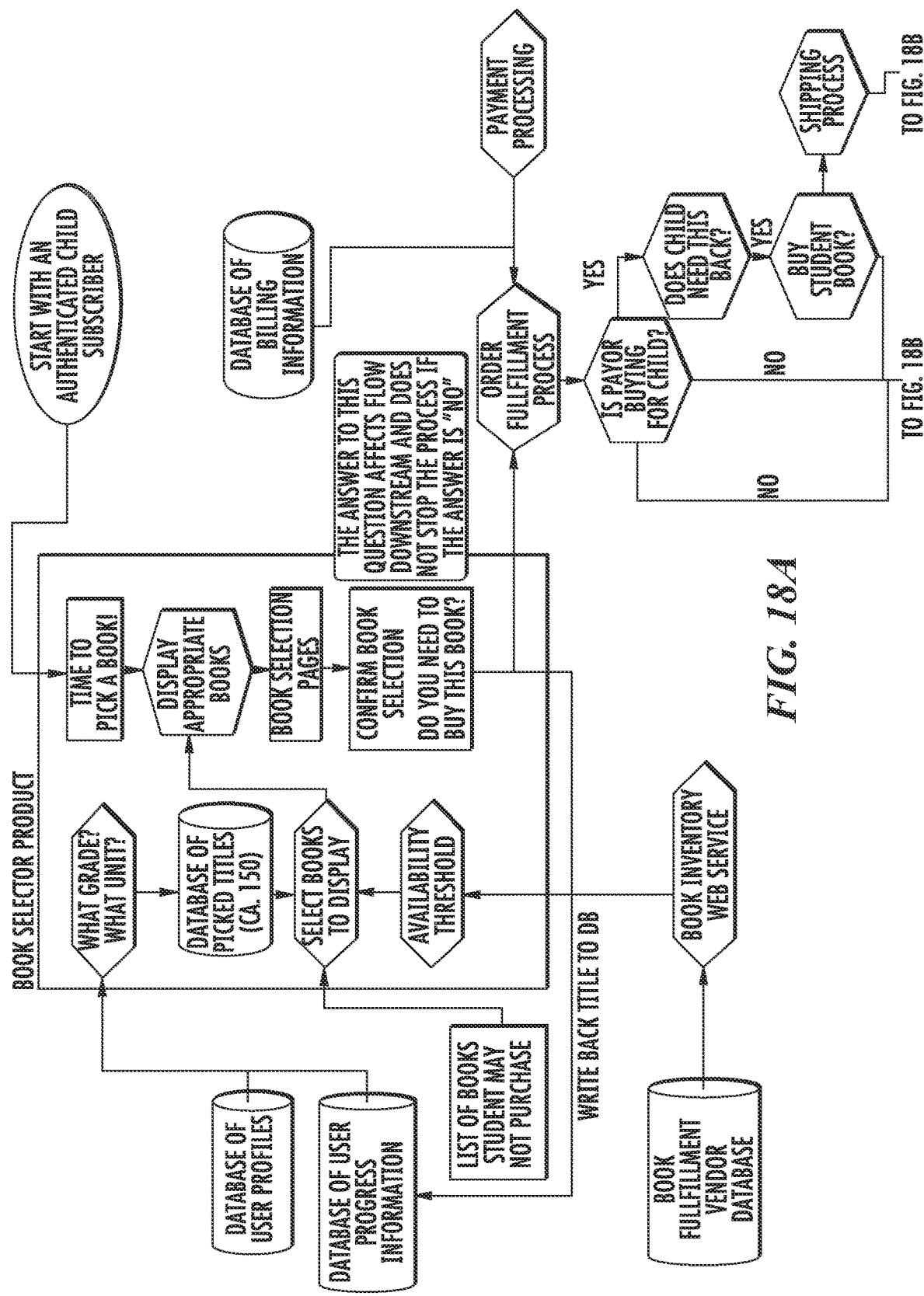
FIGS. 18A and 18B illustrate a flowchart showing the steps of the book fulfillment work flow.
Figure 18B:
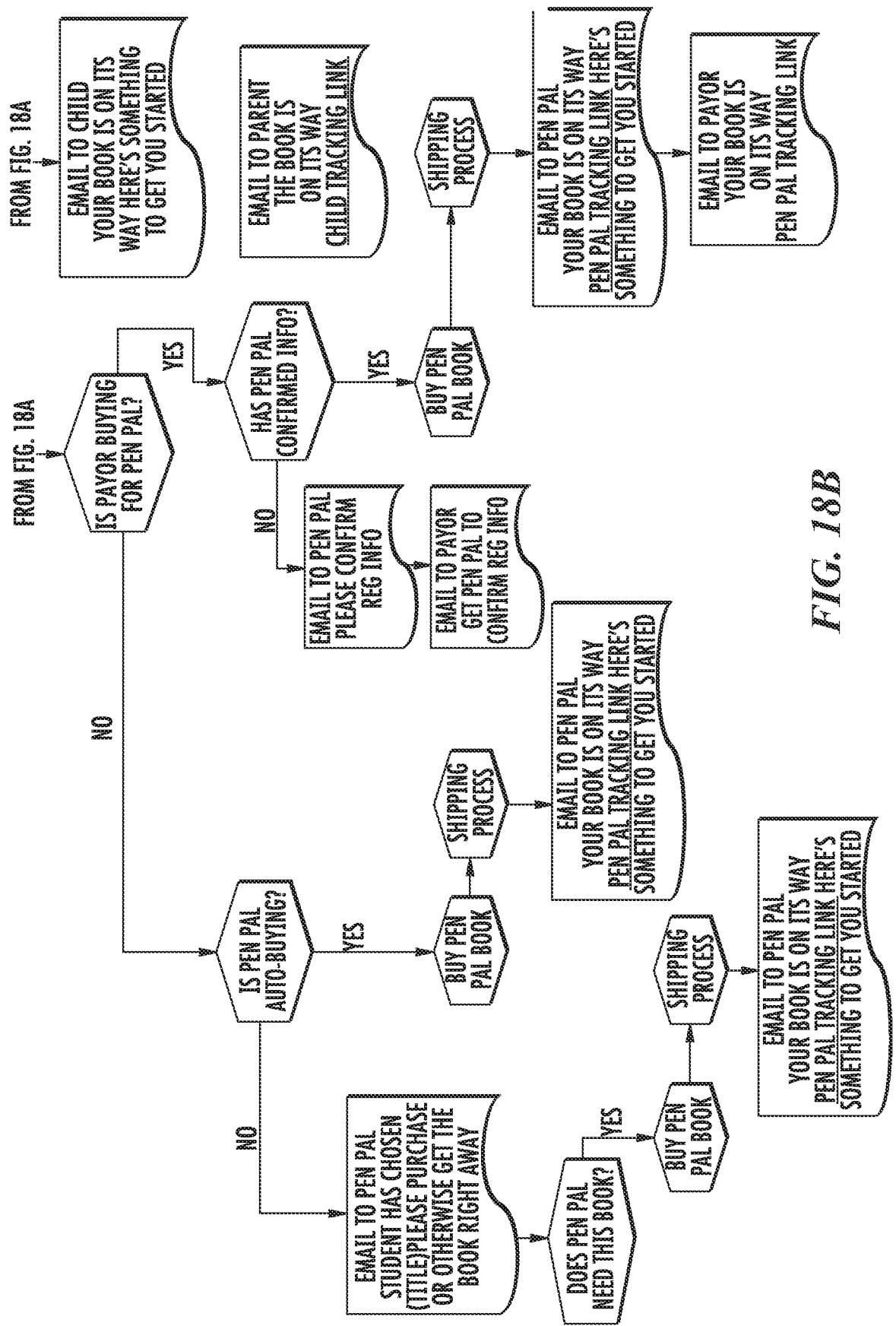

The book ordering process is shown graphically in the flowchart in FIG. 18. As shown therein, after the book is selected and ordered, the Fulfillment Center creates the packing slip and ships the chosen genre book(s) to the pen pal according to pre-chosen methods.

Workbench alerts the pen pal of the new genre book assignment from student.

The student composes their introduction letter (draft & final) and sends to the teacher's inbox not later than 14 days after receipt of pen pal intro letter. Teacher reviews, comments, and releases student introduction letter to pen pal mailbox to close out the cycle. The teacher's closing of the cycle actually triggers the program operator to request the Fulfillment Center to ship the genre book to the student. Workbench generates a new mail alert to pen pal announcing the arrival of the student's intro letter and the Fulfillment Center creates the packing slip and ships the books to the classroom according to the method specified. Fulfillment Center pushes shipment/delivery confirmation manifests with invoices to Workbench quarterly.

The pen pal receives and read initial genre book that has been chosen. Pen pal reads student introduction letter and then composes genre letter and uploads it via Pen Pal Place to the teacher's mailbox not later than 14 days after receipt of the student introduction letter. Workbench will generate auto-message alerts of new mail to the teacher with the arrival of each pen pal letter until all pen pal letters have been submitted.

Teacher reviews, edits, if necessary, and releases pen pal letters to students. Teacher's release of pen pal letters to students triggers Workbench to generate an auto message alert of new mail to students and the Genre Book Selection Availability to teacher/student.

Student makes the next genre related book selection and sends to teacher's inbox. The teacher accepts/rejects and/or overrides the student's book selection and uploads that to the Workbench. Workbench pushes Book Selection Manifest by classroom to the Fulfillment Center and Fulfillment Center creates the packing slip and ships next genre books to pen pals according to the method specified.

Workbench alerts pen pal that they have a new genre book assignment from student. Student composes genre letter (draft & final) and sends to the teacher's inbox not later than 14 days after receipt of pen pal's letter on the first genre book.

Ultimately, after completion of one or more cycles of reading and writing with respect to a particular genre, teacher may review, comment, and release all student letters to pen pal mailboxes to close out a particular genre of books. The teacher's closing of the genre triggers a program request to the Fulfillment Center to ship the next genre books to students according to the method specified. Workbench generates a new mail alert to pen pal announcing the arrival of the student's (genre) letter. The Fulfillment Center creates the packing slip and ships the books to the classroom according to the method specified. Again, the Fulfillment Center pushes shipment/delivery confirmation manifests with invoices to Workbench quarterly.

As can be seen, the release of pen pal letters to students by the teacher triggers Workbench to generate and post an auto message of Book Selection Availability to Teacher and Student Places. The students may choose a book title and forward it to their teacher's inbox. Teachers will accept/reject and/or override the selections made by the student before saving/uploading the completed order to Workbench through Teacher Place. Upon receipt of the Teacher's book selections, Workbench generates an auto message of "THANKS" to the teacher verifying/confirming receipt of the selections. Workbench also generates an auto message to Pen Pals announcing the new book selection title en route from the student. Workbench pushes the Book Selection Manifest by classroom to the Fulfillment Center Site for shipping to pen pals. The Fulfillment Center creates the packing slip and ships the books to the Pen Pal according to the method specified. Fulfillment Center pushes shipment/delivery confirmation manifests with invoice to Workbench quarterly.

Student books are shipped only after teachers release student letters to pen pals signaling the close of the genre. Workbench pushes the classroom Book Selection Manifest to the Fulfillment Center Site for shipping to students. The Fulfillment Center creates the packing slip and ships the books to the classroom according to the method specified. Fulfillment Center pushes shipment/delivery confirmation manifests with invoice to Workbench quarterly.

Teachers can make and upload Book Selections to workbench as early as one day following receipt of the Book Selection Availability auto message or as late as the current genre student letters due date. However, the selections must be made not later than this due date so as to provide enough time for pen pal shipments. If book selections are not made by this date, Workbench will generate an auto message that book selections due (on a specific day) are tardy and that the students will receive the default book title for his/her grade level and genre. The message will also reiterate that selected book titles are on a first-come, first serve basis and will not be changed for any reason.

Workbench generates an auto message to the teacher confirming the default book selection title and an auto message to pen pals announcing a new book selection en route from the student. Workbench pushes the Book Selection Manifest by classroom to the Fulfillment Center Site for shipping to pen pals. The Fulfillment Center creates the packing slip and ships the books to the Pen Pal according to the method specified. Fulfillment Center pushes shipment/delivery confirmation manifests with invoice to Workbench quarterly.

All student and pen pal letters uploaded to Workbench are filtered initially through screening software before they are deposited into the individual Teachers Letter Processing Queue for a more detailed content and security screening of identifiable and questionable/inappropriate information. Teachers will delete identifiable information (surnames, school names, date of birth, addresses) on student and pen pal letters before uploading to the pen pals/students. Teachers/pen pals will upload to Workbench Help Desk any letters containing content deemed questionable or inappropriate they wish to escalate for appropriate action. Workbench generates an auto message of "THANKS" to the teacher and/or pen pal for reporting an issue with an estimated resolution of 36 to 48 hours or less. Staff will contact affected participants and determine an amicable solution.

Teacher may compose and send standard email messages to his/her student and students' pen pals and other program participating teachers through the Writing and Message Centers using pre-populated email addresses. Teachers may also develop moderated discussion (questions) forums on appropriate, grade specific subject matter/topics for his/her classroom students.

Pen pals may compose and send standard email messages to his/her student through the student's teacher, and other pen pals via Pen Pal Place Writing and Message Centers using pre-populated email addresses. Students may compose and send standard email messages to his/her teacher and pen pal through the Writing and Message Centers using pre-populated email addresses. Students may participate in moderated discussions with his/her classmates through the Moderated Discussion Forums developed by the teacher. Teachers will moderate the discussion. Teachers, students and pen pals may escalate or report messages deemed inappropriate. The program operator may monitor and/or edit any messages.

Teachers, pen pals, and students may request program assistance from or report inappropriate use at any time by visiting Teacher Place, Student Place, or Pen Pal Place and selecting "HELP".

The student portion of the system is administered as follows. First, teachers review the program overview and rules of conduct with new students, and then download and distribute the COPPA Consent Form for student and parental signage. Teachers log on to Workbench through Teacher Place to enter the class roster of student(s) with the student's name, ID, grade, and gender.

Workbench generates student login usernames and passwords immediately following the teacher's data entry of student. Teachers will distribute the students' usernames/passwords at his/her convenience. Workbench will generate an auto message to the teacher "welcoming his/her class", confirming receipt of the class roster and informing his/her that we are generating pen pal assignments for the students.

Teachers and students receive pen pal assignments not later than 48 hours following the entry of the last student. Students are normally matched to pen pals at a one-to-one ratio.

Workbench uploads the pen pal's introductory letter to the teacher and generates an auto-message to the teacher that the pen pal's intro letter has been posted to the teacher's mailbox. Teachers review, edit if necessary, and release the pen pal intro letter to the student's mailbox.

The student composes a combination intro/genre letter (sharing the current book with a classmate). Teacher processes and submits the letter at the end/closing of the current genre.

Students may be opt out the program at the beginning of the school year by the parent or guardian or decide to discontinue their child's participation in the program at any time before the end of the school year by requesting this action through the teacher. The teacher can also terminate a student's participation for cause. The teacher will access his/her class roster through Teacher Place by entering the cancellation/termination reason and deactivate the student. Workbench will systematically un-match the student from the pen pal and generate an auto message to the student's teacher confirming the student's status change with reason and that he/she have been un-matched from pen pal (name) and alert the pen pal of the student's status change with the reason and that they have been placed on the waitlist for a new assignment.

A student's participation status may be terminated upon failing to submit letters for two consecutive genres. Workbench will generate an auto message that the letter due (on a specific day) is tardy five (5) days following the due date. Day fifteen after the due date (if the teacher doesn't mark the student absent) indicates the student failed to complete a letter assignment for one genre and workbench marks the student absent and generates an electronic message to the student reiterating the importance of letter submission on schedule so as not to diminish their experience or the pen pal's and that participation will be terminated if they fail to submit a letter for the next genre.

Should the student submit the letter within the 15-day period in which letters were deemed tardy, Workbench will generate an auto message of "THANKS" to student for submitting the letter and reiterate the importance of completing assignments so that he/she continue to build their reading, writing, and thinking skills. Should the student fail to submit a letter for a second consecutive genre, Workbench will generate an auto message to the teacher and student that the letter due (on a specific day) is tardy five (5) following this date. Day 15 after the due date (if the teacher doesn't mark the student absent) indicates the student failed to submit his/her letter for a consecutive genre—the second offense and workbench will generate an auto message requesting the teacher to verify the students classroom status and whether the student's participation should be terminated due to lack of following the program's rules of conduct.

Depending on the outcome, staff may deactivate the student through Workbench which will in turn un-match the student from the pen pal and generate auto messages to the student's teacher and pen pal regarding the student's status change with the reason and that the pen pal has been waitlisted for a new assignment.

For the Introductory/Start-up, Workbench generates an auto-message to teachers that the pen pals' intro letters have been posted to the teachers' mailboxes. Teachers will review, edit if necessary, and release the pen pal letters (individually or by batch) to the students' mailboxes. Students compose and edit response letters or drawings in the Writing Center and transmit to the teacher's in-box. Teachers review, provide feedback to the student for corrections, etc. before uploading the students' letters via Teacher Place (individually or by batch) to the Pen Pals' mailboxes not later than the genre end date (approximately 14 days). Workbench generates an auto message of "THANKS" to the teacher and student for submitting the student letters.

Workbench generates an auto-message (new mail alert) to the pen pals that the student letters have been posted to their mailbox. Students absent at the time of letter submission may still submit a letter up to fifteen days after the classroom due date (before the student forfeits his chance to write) if the teacher has contacted the pen pal regarding the delay (and provided an estimated time of arrival) and has closed out the genre on schedule. If a student misses two consecutive writing assignments, teacher must conference w/pen pal (via email) to determine if the pen pal should continue to write and/or if the student will/can continue the program.

Teachers may escalate pen pal letters with questionable content for resolution if they are unable to resolve the issue with the pen pal.

Teacher will close out each genre with a letter from each student and/or include an explanation for any missing student letters. These explanations will be forwarded to the appropriate pen pals.

Teachers will report any difficulty uploading letters to the Workbench Help Desk through Teacher Place and Workbench will generate an auto message of "THANKS" for reporting the issue with a resolution estimated time of 48 hours or less.

Should the teacher fail to submit student letters fifteen (15) days after the due date or elects not to submit letters, she/he will be terminated from the program due to non-compliance. Should the teacher submit a partial classroom of letters and/or fail to contact the affected pen pal with an explanation and/or fails to close out the genre completely, on day fifteen (15) following the due date, workbench will automatically mark any and/or all students missing a letter absent, closing the genre. Workbench generates an auto-message to the teacher reiterating the importance of staying on task and meeting the terms of service so as not to diminish the experience for the students or pen pals, and that a second offense may result his/her classroom's termination from the program.

Students are marked absent with reason at the closing of the genre by the teacher if no letter is submitted. A student marked absent has up to fifteen (15) days after genre letter due date to complete his/her letter before this assignment is tagged as a failure to follow the program rules of conduct.

The release of pen pal letters to students by the teacher triggers Workbench to generate and post an auto message of Book Selection Availability for the next genre to Teacher and Student Places. Students may choose a book title and forward it to their teacher's inbox. Teachers will accept/reject and/or override the selections made by the student before saving/uploading the completed order to Workbench through Teacher Place.

Should a pen pal withdraw/terminate mid-program, the program operator will deactivate the pen pal and Workbench will systematically un-match students from pen pals and generate an auto message to the student's teacher the pen pal's status change with the reason and that the student has been re-matched to a new pen pal and provide the name. Workbench will generate a standard close-out letter of explanation from the departing pen pal to the student and introduce the new pen pal. Workbench will generate an auto message to the new pen pal with the student's name, current book assignment and the letter due date. The program operator will send a standard email to the former pen pal thanking them for participating in the program, etc. The program operator may report the withdrawal/termination to the corporate partner from which the volunteer pen pal came.

Student may compose and send standard email messages to his/her pen pal through the teacher through the Writing and Message Centers using pre-populated email addresses. Student may participate in discussions with his/her classmates that are monitored by the teacher through the Moderated Discussion Forums developed by the teacher. Student may compose and send standard email messages to his/her teacher through the Writing and Message Centers using pre-populated email addresses. Student may participate in moderated discussions with his/her classmates that are moderated by the teacher through the Moderated Discussion Forums developed by the teacher.

The teacher portion of the system is administered as follows. First, teachers log on to the program's website and complete a program application/agreement (agreeing to all terms of service) for approval along with their grade level, email and shipping (classroom) addresses. Applications are reviewed by the program managers and are either approved or rejected. Upon completion of the review process, the teacher is notified of approval or rejection as participants.

Staff manually enters initial information for approved schools and teachers into Workbench and initiates the classroom status (associates teacher with classroom). Teachers should display an adequate degree of knowledge of the program flow, have sufficient terms of service and demonstrate proficiency in navigating through Teacher Place as well as Student Place.

A teacher will commit to participate for the full school year and sign-up/attend the orientation session. Upon completion of the orientation, Workbench generates a "Welcome" message to the teacher that includes the teacher's username and password as well as the start-up process for enrolling students, participation criteria for students, and information on privacy, COPPA, etc.

Withdrawal of a teacher from the program should be the last resort. Should the teacher need to withdraw, he/she shall send an email preferable sharing the reason for withdrawal to the Workbench Help Desk through Teacher Place. Workbench will generate an auto message of "THANKS" for reporting the issue with a resolution estimated time of 48 hours or less. Workbench will systematically lock-out teachers, un-match students from pen pals, and generate auto messages to the students' pen pals regarding the students' status change, with a reason and an indication that they have been placed on the waitlist for a new assignment. The program operator will send a close out letter to the teacher (with a copy to the Principal) thanking him/her for participating in the program.

Teacher participation may be terminated upon missing one genre of letter submission. Five (5) days after the due date, workbench will generate an auto message to the teacher that letters due (enter specific date) are tardy, reiterate the importance of complying with the terms of service so as to ensure a positive rewarding experience for students and pen pals and request an estimated time of arrival for the student letters. Teacher will contact all pen pals with an explanation for the tardiness and include an estimated time of arrival for the letters. The program operator will generate an email of delay and include the teacher's explanation and estimated time of arrival for the letters. Ten (10) days following the due date, workbench will generate an auto message to the teacher that pen pals are still awaiting student letters and that termination from the program will result if letters are not submitted in the next week. Fifteen (15) days after the due date indicates the teacher failed to submit letters to closeout that genre and the program operator then sends an email message to the teacher (with a copy to the Principal) reiterating the importance of their commitment to excellence made at the beginning of the school year and that effective immediately participation forfeiture has commenced and services are terminated. The teacher will be deactivated through Workbench which will in turn un-match students from pen pals and generate auto messages to the students' pen pals regarding the students' status change and that they have been placed on the waitlist for a new assignment. Should the teacher submit letters within the 15 days of the original due date; Workbench will generate an auto message of "THANKS" to teachers for submitting letters and reiterate the importance of submitting assignments on time so as not to diminish the experience of the students and pen pals. Teacher will contact all pen pals with an explanation for the tardiness to close out the genre so that books can be shipped to the students.

The general process of teacher involvement is described above and below with respect to the operating procedures for students and pen pals.

Teachers may compose and send standard email messages to his/her students' pen pals and to his/her students through the Writing and Message Centers using pre-populated email addresses. Teachers may develop moderated discussion (questions) forums on appropriate, grade specific subject matter/topics for his/her classroom students. Teacher may also compose and send standard email messages to other program participating teachers through the Writing and Message Centers using pre-populated email addresses. Teachers may request program assistance from or report inappropriate use by visiting Teacher Place and selecting "HELP".

The pen pal portion of the system is administered as follows. First, a prospective pen pal is determined and registered by logging on to a controlled website that is administered by the program operator. The pen pal, after entering their email address and creating a password at the initial screen, complete the pen pal application/agreement. After agreeing to all the program operator's terms of service, the pen pals undergo and pass a security check on the next screen. Upon completion and successful submission of the application, prospective pen pals will receive an on-line thank you for completing an application.

An automatic message is then delivered from the Workbench indicating that the program operator is processing the application/agreement and that the program operator will contact the pen pal upon completion of the process and security check, generally in about fourteen (14) days.

If the pen pal passes the security check, the program operator will send an online "Welcome" letter through email that the security check is complete and will provide information on privacy, COPPA, etc. The email will also request the pen pal to use their username and password (submitted when they completed their application) to access an online site area called "Pen Pal Place".

If the pen pal doesn't pass the security check, the program operator will send an online letter to the pen pal stating they failed to meet the program criteria.

After the pen pal completes the application process successfully and agrees to follow all terms of service, including notification of any changes in contact information (mailing & email addresses), they are then asked to change their password and are invited to modify their profile at the initial log-in. The pen pal may provide preferential information to the program operator on their profile to assist in determining which student is a better match.

An initial message welcomes the pen pal to the program and provides helpful hints/instructions on completing the initial introductory assignment (a letter of introduction) prior to being matched to a student. The pen pal then composes, edits, and uploads the introductory letter to Workbench.

The program operator will make the initial match of pen pal to student on a first come, first serve basis from a pool of pen pals who have successfully completed the application process that includes submission of the introductory letter. In making the match, the program operator may take into account any preferences (grade, etc.) noted in the pen pal's profile.

Workbench generates an automatic message to the pen pal introducing their student, the current book assignment, and the due date. The program operator will upload the pen pal's introductory letter to the assigned teacher's mailbox. During the assignment process, the program operator may re-assign pen pals to the next available student when necessary and Workbench will generate an auto message with the new match assignment (student's name) and the student's current book, writing assignment and the corresponding deadline.

Pen pals remain active until they cancel their participation via writing or are terminated. Should the pen pal need to withdraw from the program, he/she completes a request via the Contact Us link on Pen Pal Place and indicates the reason for withdrawal. Workbench will generate an auto message of receipt and a "THANKS" for reporting the issue and indicating that resolution will occur within 48 hours. The program operator will deactivate the pen pal and Workbench will systematically un-match students from pen pals and generate auto messages to the students' teacher regarding the pen pals' status change with the reason for withdrawal and indicating that they have been re-matched to a new pen pal. Workbench will generate a standard close-out letter from the pen pal to the student and introduce the new pen pal to the student according to the process described above. Workbench will generate an auto message to the new pen pal with the student's name, current book assignment and the letter due date. The program operator will send a standard email to the former pen pal thanking them for participating in the program, etc. In addition, the program operator may generate an aggregate report on withdrawals to the corporate partners who are supplying the pen pals.

Pen pal participation may be terminated upon missing two genres of letter submission. When the pen pal misses a letter deadline (1st offense), Workbench will generate an auto message that the letter due (on a specific day) is tardy and will reiterate the importance of submitting assignments on time so as not to diminish the experience of the teachers and students. Workbench may also warn that termination may result if the pen pal fails to submit a letter for another cycle. The message will also inquire if the pen pal is experiencing difficulty adhering to the program timeline and asking them to contact the program operator is so to discuss whether or not this is the right volunteer opportunity at this time.

When a pen pal is replaced, another volunteer pen pal will be asked to write to the student. The volunteer pen pal will compose, edit and upload the letter to the teacher's mailbox. The teacher will review, edit if necessary and release the letter to the student.

Should the pen pal fail to submit a letter for a subsequent genre, Workbench will generate an auto message to the pen pal that this is the second offense of a tardy letter due (on a specific day), and reiterate the pen pal's commitment to excellence, the importance of meeting deadlines and that effective immediately their services are no longer required and their program participation has been terminated.

Another volunteer pen pal will be asked to write to the student. The volunteer pen pal will compose, edit and upload the letter to the teacher's mailbox. The teacher will review, edit if necessary and release the letter to the student.

The program operator will deactivate the terminated pen pal through Workbench, which will in turn un-match students from the pen pal and generate auto messages to the students' teacher regarding the pen pal's status change with the reason for termination and the fact that the student has been assigned to a new pen pal. Workbench will generate a standard close-out letter from the former pen pal to the student and introduce the new pen pal and will generate an auto message to the new pen pal with the student's name, current book assignment and the letter due date. The program operator will then send a standard email to the former pen pal thanking them for participating in the program.

Pen pal letters are handled as follows. First, Workbench generates an auto-message to pen pals that the student's intro letter has been posted to the pen pal's mailbox. Then the pen pal composes, reviews, edits, and uploads their letter to Workbench via Pen Pal Place not later than the scheduled due date (approximately 14 days). Workbench generates an auto-message to teachers that the pen pals' genre letters have been posted to the teachers' mailboxes.

Teachers review, edit if necessary, and release pen pal letters via Teacher Place (individually or by batch) to the student's mailbox. Workbench generates an auto message (new mail from your pen pal alert) to the student.

Pen pals report any difficulty uploading letters via the Contact Us Link on Pen Pal Place and Workbench generates an auto message of "THANKS" for reporting the issue with an estimated time of resolution in 48 hours or less. Workbench help desk staff or the program operator respond with a disposition of the issue not later than 48 hours after the reporting.

Pen Pal will receive an email from teacher if the student's letter is expected to be at least one-day, but not later than 14 days late, or if the student is unable to write for this genre and includes the reason.

The pen pal may request to be re-matched if the student misses two writing assignments by completing a request form via the Contact Us link on Pen Pal Place.

Pen pals may escalate student letters with questionable content to the program operator for resolution if they are unable to resolve the issue with the teacher.

When the pen pal misses a letter deadline, Workbench will generate an auto message that the letter due (on a specific day) is tardy and reiterates the importance of submitting assignments on time so as not to diminish the experience of the teachers and students. Workbench may also indicate that participation termination may result if the student fails to submit a letter for another genre. The message will also inquire if the pen pal is experiencing difficulty adhering to the program timeline and explaining that if they are, they should contact the help desk or the program operator to discuss. If the match is not appropriate, another volunteer pen pal will be asked to write to the student.

Pen Pal may compose and send standard email messages to his/her student's teacher, to the student, or to other pen pals via Pen Pal Place Writing and Message Centers using pre-populated email addresses. Pen pals may escalate or report messages deemed inappropriate to the program operator via Pen Pal Place and selecting the Contact Us link.

The present invention is generally directed to process, project or problem-based learning within social networks. These learning concepts include:

Creation of mechanisms to help learners perceive the learning process positively through gradual feedback, rewards, and challenges.

Acquisition of new knowledge in a way that extends from what learners already know.

Refinement of knowledge through analysis, review, and collaboration.

Utilization of knowledge to make decisions, perform meaningful tasks, and ask additional, meaningful questions.

Development of skills for self-directed learning and critical thinking.

Experiential learning in this context is more than "learning by doing." Learning by doing is a key element, but only when combined with constructivist guidelines, whereby learning is a dynamic, guided process. In the presently described embodiment, learners are faced with new situations, content, problems, and interaction with people and/or activities that they solve, with guidance provided as necessary. A relationship for the purpose of learning—based on expertise, enrollment in a common course, prior history, or other reasons—is explicitly established as a "learning connection" between two nodes in a social network. Interaction between these nodes is tracked separately from interactions with other nodes in a social network for purposes other than learning.

In one embodiment, the system is a framework for providing developers of instructional systems with a method for specifying the states in a learning process, transitions from state-to-state, constraints, timing, and rules associated with process-based learning. The framework further provides social networking capabilities such as blogs and forums to implement collaborative activities create and manage groups of similarly situated groups of people, and manage interaction among them within a learning network.

One purpose of the invention is that students learn cumulatively, interpreting and incorporating new material with what they already know and building knowledge progressively through interaction and collaboration with others. At times, students' ability to comprehend has a tendency to level off, and their understanding can increase incoherently rather than steadily, depending on accumulation of facts and skills. The current framework enables progression in levels of understanding and presents content and activities. Content, connections with others, and activities advance throughout a period of study, making use of semantic connections with other topics, previous comprehension on the same topic, and people in the learning network.

In one embodiment, the framework serves as a development platform that provides interfaces to organize management of participant communities that engage in a variety of learning processes—defined using the methods of states, constraints, attributes, transitions, rules, etc.—that involve communication with other members of a social network. The framework enables roles to be defined and configured in the network and includes verification, validation, and management of safety policies. The system allows specification of policies and rules associated with the defined roles. Roles can then be associated with validation procedures and constraints, access levels to functionality and other members of the network, the type of content presented, and the interface that is offered for interaction. Some roles (e.g., administrator) have the ability to delegate authority for determining policies and rules to other roles (e.g., give teachers authority over students).

In one embodiment, the system includes a variety of roles, including course author, course, group, institution, or network administrator. "Learners" may be students, adults, teachers, parents, or anyone who engages in a learning activity within the system. Facilitators have a specific role of providing guidance, modeling, or expertise, while researchers study efficacy of different techniques such as learning methods. A user may have more than one role. For example, a teacher may be an administrator, facilitator, and student at the same time.

In another embodiment, the framework for this learning system also defines and manages formative assessments that are integrated into the flow of the learning process. It provides a general mechanism for specifying types of assessments, factors associated with those assessments, and management of scoring and analyses based on the assessment types and factors. The framework also provides access to data on interaction, communication, posts and replies, and publication between participants in a collaborative network to assess learning activities degree of interaction.

In yet another embodiment, the framework provides an interface to plug-in tools, applets, and/or applications that support specific learning processes, which may, for example, include an interactive science project or a group collaboration directed to developing alternative plots or endings to a narrative. In one embodiment, the framework provides application programmer interfaces to the framework to manage a user's state, configuration, role, etc., as the user interacts with the applications and overall learning system.

The system also provides typical information management services to obtain and store information related to users, courses, history, assignments, assessment, payment, and other general areas related to a system's users. The system manages an iterative or sequence of steps in a defined learning process in order to dynamically adapt based on each learner's role, usage characteristics, profile, and assessment.

In one embodiment, the framework provides the ability to specify definitions regarding an engaging learning activity that conveys to participants a positive attitude about learning, especially in the initial interaction with the system. These processes simultaneously glean data that can be subsequently used by other processes in the learning flow in such a manner to help the system adapt the level of the tools, content, place in process, etc. that are appropriate to the participant's learning ability. This data includes items such as each participant's start state and set of attributes that characterize them as a learner (e.g., age, grade, interests, level of expertise, participation level, etc.) The information gathered is also part of the start state for the overall system.

As a participant progresses through a sequence of communications other members of a social network with whom they have established an explicit learning relationship (e.g., mentor) the system assesses the progression and delivers constructive feedback, as opposed to formal grades of traditional systems. This assessment enables opportunities for refining the discovery of people and content that are relevant to a learning objective.

Interactions between people who have an explicit learning relationship (e.g., student-teacher, mentor-student, peer-to-peer) are tracked, monitored, and weighted differently than interactions between members of a social network that do not have an explicit learning relationship. For example, if person A is a mentor to person B on subject C, and person A posts a question to a forum on subject C friends or other members of the social network who have no bearing on the learning process post replies, the dialogue is not tracked as a learning exchange whereas posts from person A would be recognized, tracked, and analyzed as part of a learning process.

The system uses multidimensional data structures to enable this horizontal and vertical integration of subject matter and members of a social network establishing an explicit type of relationship between members in a social network for the purpose of learning or the exchange or knowledge or content. Members may be individuals, groups, or other entities that are characterized by similar attributes.

Once an explicit learning relationship and process have been defined, the system tracks progress, dynamically updates status, and adapts delivery of content and functionality based on this relationship. If a mentor comments on a blog post made by a mentee, and there is an explicit relationship between the two, the post and reply may be presented on the mentor and mentee's social learning network home page. If a mentor goes to a forum, they could filter posts and replies to include only those participants with whom he/she has an established learning relationship.

The classification schemes of subject matter interest and learning relationships enable this problem-based content management system to retrieve content and interactive activities derived from factors that are based attributes related to the current learning process. Similarly, the same attributes (e.g., age, level of expertise) are used to dynamically customize the presentation, interface, and tools used to guide the participant through that content. The participant's self-directed discovery leads to connections with others in the social network who have similar attributes regarding learning such as grade, age, interest, and level of expertise.

While the invention has many different applications, for the purposes of this example and the present disclosure, copending patent application entitled "System for Developing Literacy Skills Using Loosely Coupled Tools in a Self-Directed Learning Process within a Collaborative Social Network," filed simultaneously herewith and bearing U.S. application Ser. No. 11/937,497, is incorporated by reference herein in its entirety. The present system and method may be incorporated, in one embodiment, into the learning process within the collaborative social network described therein.

In one embodiment, the framework is a finite-state machine and a set of workflow processes, consisting of a set of states, transitions between the states, and criteria to determine when a participant or object exits a state. These include both specific actions and the passage of time in the absence of an expected action. Messages to the learning community or to the users are based on transitions between states, which can combine single states or two or more into one (a joint transition), or can fork to a choice of states. The framework provides an interface for defining these transitions and for communicating events dynamically to specific members of the network.

In one embodiment, the set of states are read a book, read a letter from a mentor about the book, discuss the book within the social network using a blog or forum, and reply to the mentor about the book. The four states of the learning process are read book, read mentor letter, post to public forum, and reply to mentor. The framework tracks all interactions based on subject matter and learning relationships within the social network. Based on those interactions or lack thereof modifies the content, notices, and activities that are presented to the user when connecting to the network or people and content within it.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for learning within a social network of a plurality of participants utilizing computers having nodes and storage comprising the steps of:
   in a social network having linked computers, gathering information for at least two participants on the social network via at least one of the computers and assigning each participant to a computer node;
   identifying an original state for each computer node via at least another of the computers;
   identifying similarly-situated participants by identifying similarly-situated computer nodes in the social network via the at least another of the computers;
   managing interaction of the similarly-situated participants by managing the computer node assigned to each of the similarly-situated participants via at least one of the networks;
   for each of the computer nodes having a new state at some point in time that is a change in state from the original state, identifying the new state for each of the computer nodes having the new state via at least another of the computers;
   identifying the change to the computer node's new state from the original state of each computer node that has been identified as having a new state; and
   storing, on the storage, information about the identified change.

2. The method of claim 1 further providing tailoring a set of content to each participant based on the stored information.

3. The method of claim 1 wherein the original state comprises an action of beginning to read a book.

4. The method of claim 1 wherein the new state comprises an action of finishing a book.

5. The method of claim 1 wherein the change from the original state to the new state comprises receiving a letter.

6. The method of claim 1 wherein the at least one of the computers comprises the at least another of the computers.

7. The method of claim 1 further comprising:
   facilitating a learning relationship between a first of the participants and a second of the participants;
   assessing a learning progression of the first participant; and
   providing feedback regarding the learning progression to the first participant.

8. The method of claim 7 further comprising delivering dynamic updates based on the learning relationship.

9. The method of claim 7 further comprising weighting a first set of communications between the first and second participants differently than a second set of communications between the first participant and a third participant based on an existence of the learning relationship.

10. The method of claim 7 further comprising providing feedback regarding the learning progression to a third participant.

11. The method of claim 10, wherein the third participant is a relative of the first participant.

12. The method of claim 10, wherein the third participant is a teacher of the first participant.

13. The method of claim 1 further comprising providing a customized display to the first participant based on the information gathered for the first participant.

14. The method of claim 13, wherein the information gathered for the first participant comprises a set of factors.

15. The method of claim 14, wherein the set of factors comprise an age and an education level of the first participant.

16. The method of claim 1 further comprising the steps of identifying a role for a participant and managing the interaction of the similarly-situated participants based at least in part on the identified role.

17. The method of claim 1 further comprising the step of identifying a rule associated with a participant and managing the interaction of the similarly-situated participants based at least in part on the identified rule.

18. The method of claim 1 wherein the interaction is managed after the information about the state change is stored.

19. The method of claim 1 comprising the further step of storing on the storage, information about the similarly-situated participants after the state change.

20. The method of claim 1 wherein the identification of similarly-situated participants is based at least in part on the new state.

21. The method of claim 1 wherein the identification of similarly-situated participants is based at least in part on the change from the old state.

22. The method of claim 1 further providing tailoring a set of content to each participant based on the stored information.

* * * * *